United States Patent [19]

Soma et al.

[11] Patent Number: 5,292,599
[45] Date of Patent: Mar. 8, 1994

[54] CELL UNITS FOR SOLID OXIDE FUEL CELLS AND POWER GENERATORS USING SUCH CELL UNITS

[75] Inventors: Takao Soma, Nishikamo; Shinji Kawasaki; Katsuki Yoshioka, both of Nagoya, all of Japan

[73] Assignee: NGK Insulators, Ltd., Japan

[21] Appl. No.: 948,011

[22] Filed: Sep. 2, 1992

[30] Foreign Application Priority Data

Sep. 27, 1991 [JP] Japan .................. 3-249619
Dec. 12, 1991 [JP] Japan .................. 3-328697
Dec. 12, 1991 [JP] Japan .................. 3-328698

[51] Int. Cl.$^5$ .................................................. H01M 8/10
[52] U.S. Cl. ........................................... 429/30; 429/39
[58] Field of Search ............... 429/30, 32, 33, 34, 429/38, 39, 26

[56] References Cited

U.S. PATENT DOCUMENTS

| | | | |
|---|---|---|---|
| 4,476,199 | 10/1984 | Takeuchi et al. | 429/34 |
| 4,824,741 | 4/1989 | Kunz | 429/34 X |
| 4,997,726 | 3/1991 | Akiyama et al. | |
| 5,049,459 | 9/1991 | Akagi | 429/33 |
| 5,145,754 | 9/1992 | Misawa et al. | 429/32 |

FOREIGN PATENT DOCUMENTS

| | | |
|---|---|---|
| 285727 | 10/1988 | European Pat. Off. . |
| 378812 | 7/1990 | European Pat. Off. . |
| 3922673 | 1/1991 | Fed. Rep. of Germany . |
| 57-113561 | 7/1982 | Japan . |
| 63-261678 | 10/1988 | Japan . |
| 2-278664 | 11/1990 | Japan . |
| 3-55764 | 3/1991 | Japan . |
| 2148045 | 3/1985 | United Kingdom . |

*Primary Examiner*—Anthony Skapars
*Attorney, Agent, or Firm*—Parkhurst, Wendel & Rossi

[57] ABSTRACT

A cell unit for use in a solid oxide fuel cell has a laminate structure including a cell element and a separator. The cell element includes a dense and planar solid electrolyte having a rectangular plane shape, and an air electrode film and a fuel electrode film provided on opposite surfaces of the flat solid electrolyte, respectively. The separator is made of a dense electron conductor. A plurality of oxidizing gas flow paths are defined between the separator and the air electrode, and the cell element has a rectangular planar shape and a ratio of a short side to a long side of the rectangular planar shape is not less than 2.

24 Claims, 21 Drawing Sheets

FIG_3
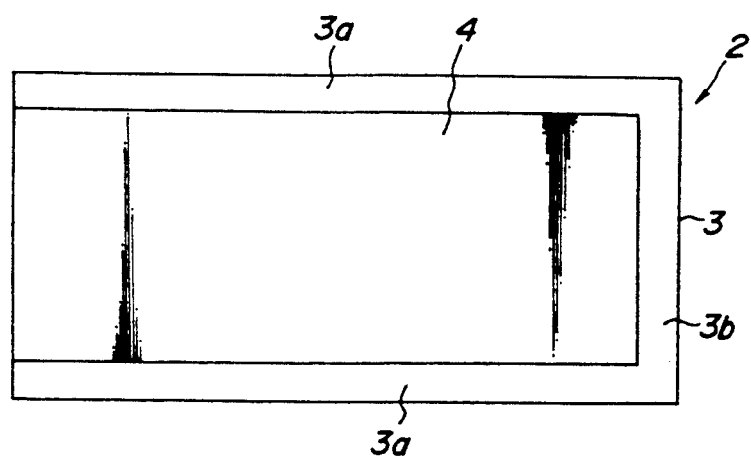
FIG_4
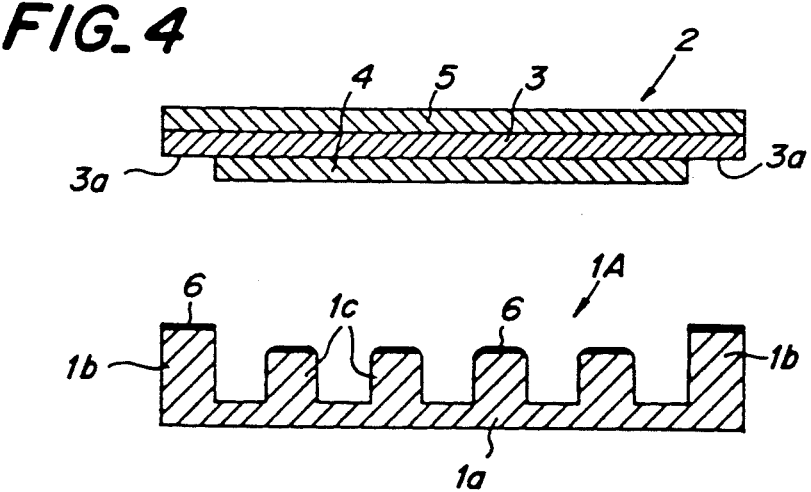

FIG_5
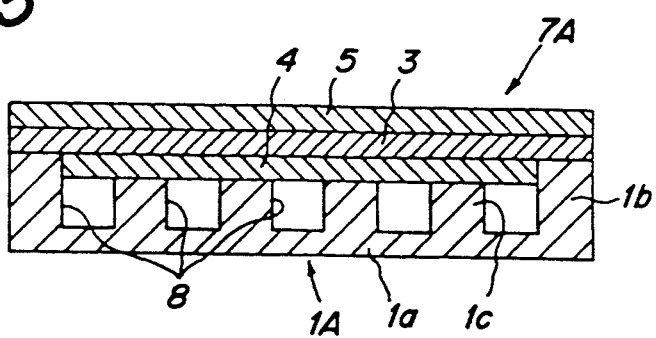
FIG_6
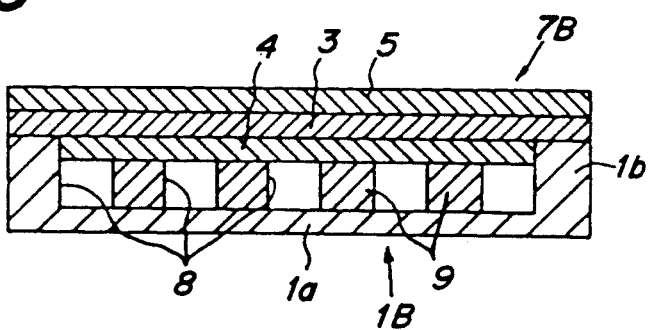

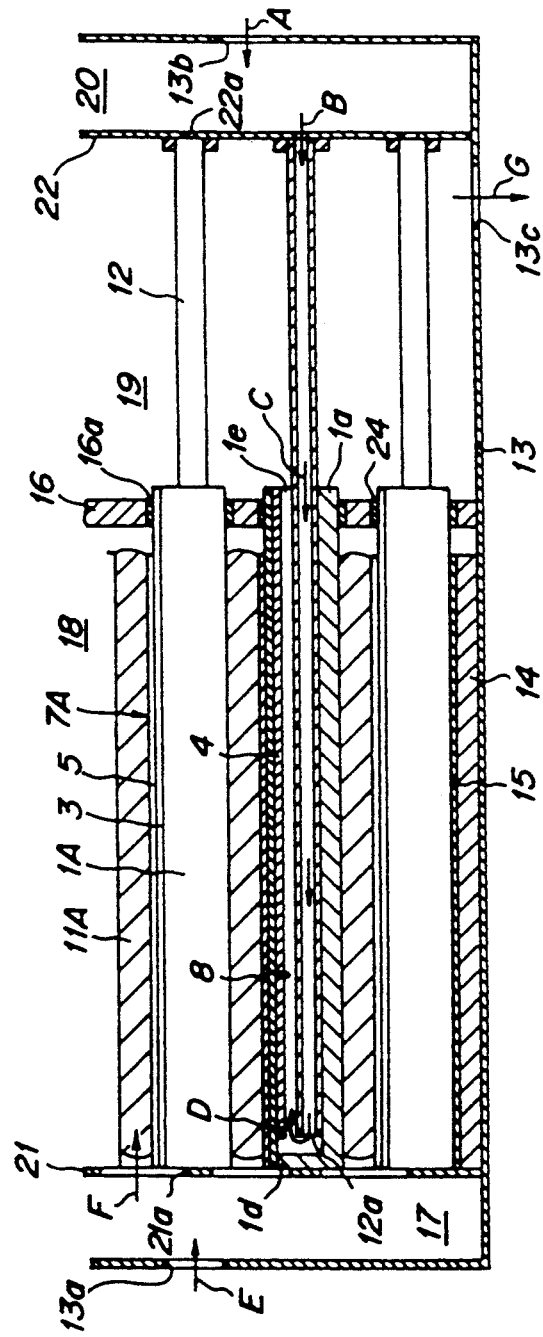
FIG_8

FIG_9
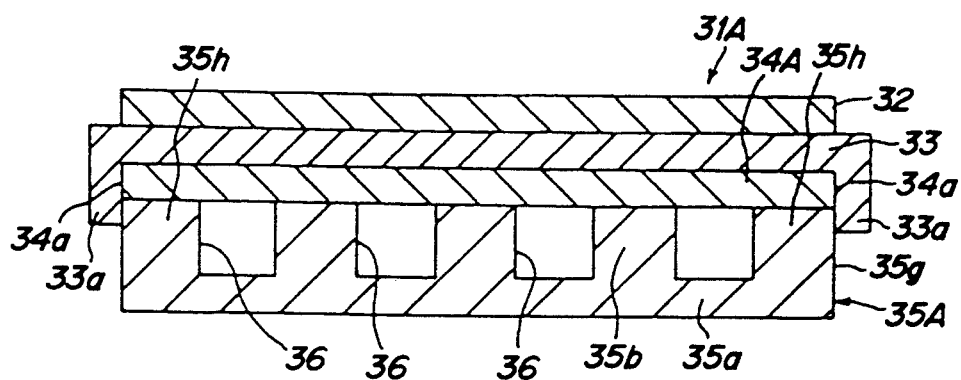

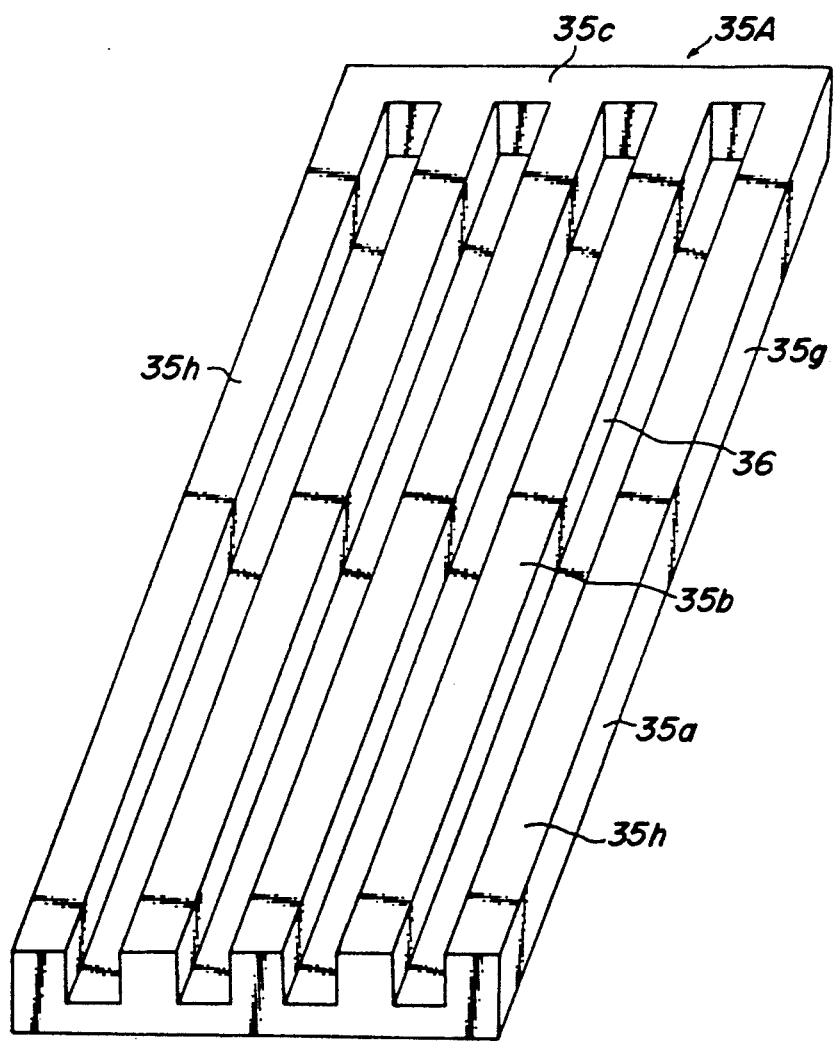
FIG_10

FIG_11
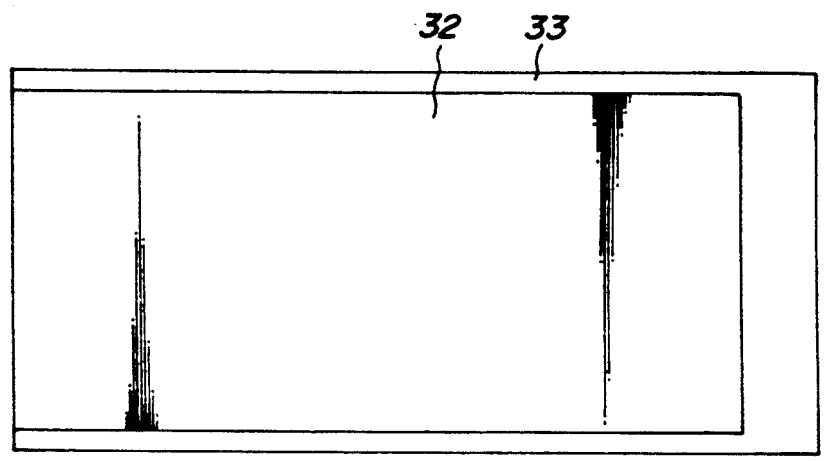
FIG_12
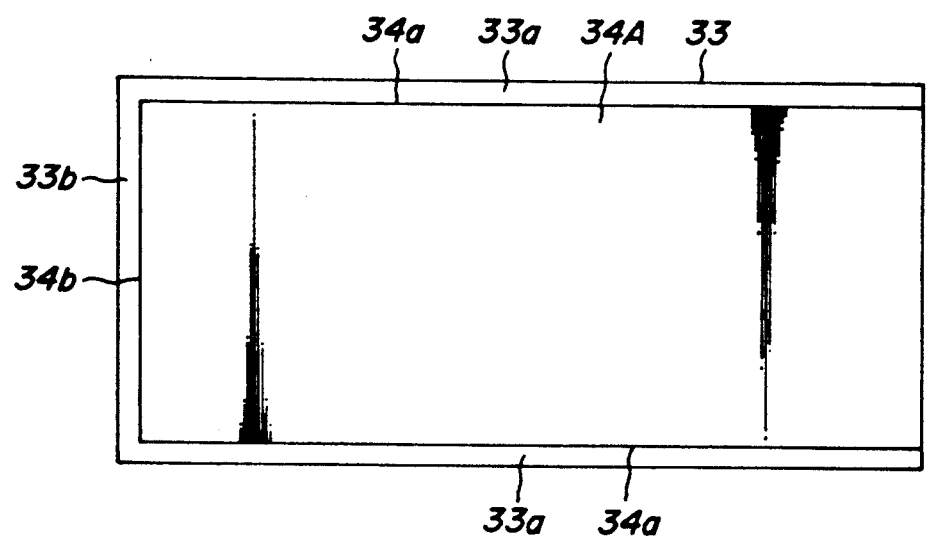

FIG_18

FIG_19

FIG_21

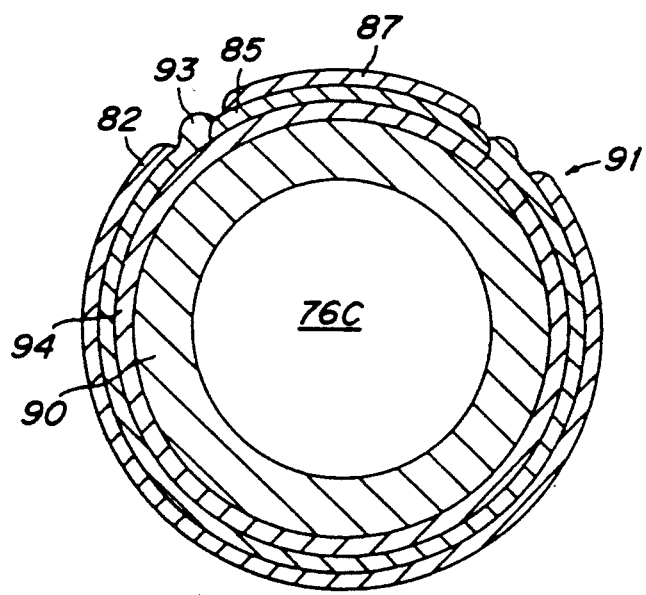
FIG_26

CELL UNITS FOR SOLID OXIDE FUEL CELLS AND POWER GENERATORS USING SUCH CELL UNITS

BACKGROUND OF THE INVENTION (1) Field of the Invention

The present invention relates to cell units for solid oxide fuel cells and power generators using such cell units.

(2) Related Art Statement

Recently, the fuel cells have attracted public attention as power generators. Since fuel cell is a device which directly converts chemical energy possessed by the fuel to electric energy and which is free from restraint of the Carnot cycle, the fuel cell has an essentially high energy-converting efficiency. In addition, the fuel cell can use a variety of fuels (naphtha, natural gas, methanol, coal-reformed gas, heavy oil, etc.), and has less public nuisance, and its power-generating efficiency is not influenced by the scale of the plant. Accordingly, the fuel cell is an extremely promising technique.

Particularly, since the solid oxide fuel cell (SOFC) functions at high temperatures of around 1,000° C., the reaction on the electrodes is extremely high, no catalyst of an expensive noble metal such as platinum is necessary at all, the polarization is small, and the output voltage is relatively high. Thus, the energy-conversion efficiency is conspicuously high as compared with other fuel cells. In addition, since the constituent parts are all constituted by solid material, the SOFC has high stability and long use life.

As mentioned above, since the constituent parts of the SOFC are all solid, SOFCs possessing various structures have been proposed. These SOFCs are broadly classified into planar type and cylindrical type (General Energy Engineerings, 13-2, 1990). Since the electromotive voltage of a cell unit in these SOFCs is about 1 V in an open circuit, and the current density is about several hundreds mA at the maximum, it is important that the cell units, each having a large power-generating area, can be easily connected in parallel and in series in the practical application. From this standpoint of view, the structure of the cell units and their stack (collected cell) must be examined.

However, in the case of the planar cell, it was difficult to produce the cell units having high plane accuracy and large area due to brittleness of ceramics. In order to solve this problem, a method is proposed to interpose a soft material between cell units for electrically connecting the cell units (Japanese patent application Laid open No. 3-55,764). However, the size of the ceramic flat plates to be integrally produced has a limit even in this case, and the structure is complicated. Thus, it is difficult to connect the cell units in parallel, so that it is difficult to increase the intensity of the output current. Furthermore, it is difficult to gas-tightly seal the planar cell units at their ends.

To the contrary, Westinghouse Electric Corporation proposed a currently most advanced production technique of cylindrical cells in which a cylindrical type fuel cell having structurally high strength is employed to mitigate brittleness possessed by ceramics and one end of the cell unit is closed to attain a sealed structure (General Energy Engineerings, 13-2, 1990). Further, this technique is excellent in that the cell units can be easily connected in parallel or in series.

However, since current flows in parallel to the solid electrolyte film in this structure, the current-flowing path is long and power is consumed in this flowing step. In order to solve such a problem, a method is proposed, in which a current-flowing path is provided at a location other than a circumferential direction of the section of the cylinder (Japanese patent application Laid-open No. 63-261,678). However, even in this case, the internal resistance of the cell cannot be decreased to such a degree as in the case that current is passed vertically to the solid electrolyte film. Further, although the above method requires that a gas-tight solid electrolyte film is formed on the porous cylindrical support, it is necessary to use a high technique having low production speed and high production cost, for example, EVD.

On the other hand, since the SOFC is operated at high temperatures of around 1,000° C., the SOFC has an advantage that a cogeneration system may be attained by utilizing waste heat of the SOFC. However, to the contrary, although the fuel gas and the oxidizing gas need be separated in a gas-tightly sealed manner so that they may not be mixed, it is difficult to gas-tightly seal the cell units at high temperatures. For example, the gas-tight sealing member such as a gasket or organic resin can withstand only temperatures up to 500° C.

Recently, sealing means has been proposed with respect to the planar cell unit (Japanese patent application Laid-open No. 2-278,664). According to this publication, planar cell units and gas-separating plates are alternatively laminated, a reservoir is formed around the outer periphery of each cell unit or the entire outer periphery of the laminate, and sealing is effected by filing a molten glass in this reservoir. However, this method has the problem in that when the temperature is repeatedly raised or lowered, the molten glass is repeatedly solidified and melted. Therefore, the sealant has poor durability.

On the other hand, in the above cylindrical cell manufactured by Westinghouse Electric Corporation (General Energy Engineerings, 13-2, 1990), one end of the cylindrical cell unit must be closed. It is difficult from the standpoint of productivity that one end of the cylindrical cell unit is closed with a ceramic material, and suitable strength is given to this sealed portion, although the cylindrical cell unit having opposite ends opened can be relatively easily shaped by extrusion at high productivity. Furthermore, in the case of the power generator using the one-end closed cell units, oxidizing gas-introducing pipes made of a heat-resistive material need be inserted and fixed into inner spaces of the respective cell units. Owing to this, the number of constituent parts largely increases, so that working to insert the oxidizing gas-introducing pipes into respective cell units is great to make the mass production difficult.

SUMMARY OF THE INVENTION

It is an object of the present invention to provide cell units for use in solid oxide fuel cells and power generators using such cell units, which can increase power generation amount per unit volume, make easy gas sealing, increase strength of each cell unit, increase reliability of the cell units and their stack, and enable easy production thereof.

It is another object of the present invention to provide a power generator which can separate a fuel gas from an oxidizing gas in a non-mixed state, can be operated stably for a long time, does not need a seal at one end of each cell unit as viewed in the longitudinal direction, and does not require oxidizing gas-introducing pipes (feed pipes) into oxidizing gas flow paths inside the cell units.

The present invention relates to the cell unit for use in a solid oxide fuel cell, said cell unit having a laminate structure comprising a cell element and a separator, said cell element comprising a dense and planar solid electrolyte having a rectangular plane shape, and an air electrode film and a fuel electrode film provided on opposite surfaces of said flat solid electrolyte, respectively, and said separator being made of a dense electron conductor, wherein a plurality of oxidizing gas flow paths are defined between said separator and said air electrode, and said cell element has a rectangular planar shape and a ratio of a short side to a long side of said rectangular planar shape is not less than 2.

The present invention further relates to the cell unit for use in the solid oxide fuel cell having a laminated structure comprising a cell element including a dense and planar solid electrolyte having a rectangular plane shape and an air electrode film and a fuel electrode film provided on opposite surfaces of the solid electrolyte, respectively, and a separator made of a dense electron-conductor and having a rectangular plane shape, wherein the planar solid electrolyte is exposed at three edge portions on a side of the air electrode film, the separator is formed with slender projections at three edge portions and provided with a plurality of grooves, and the cell element is laminated upon the separator such that the slender projections of the separator is gas-tightly joined to the exposed portions of the solid electrolyte on the side of the air electrode film, and oxidizing gas flow paths are defined by a plurality of the grooves, respectively.

The present invention still further relates to the cell unit for use in the solid oxide fuel cell, comprising a separator made of a dense electron-conductor material and having a pair of side walls at surface edge portions of a planar body having a rectangular planar shape in a width direction, and a cell element including an air electrode joined to the side walls of the separator, a dense solid electrolyte covering a surface and side surfaces of the air electrode and a part of outer wall surfaces of the side walls of the separator, and a fuel electrode provided on a surface of the solid electrolyte opposed to the air electrode, wherein oxidizing gas flow paths are formed by providing a conductive partition wall in a space defined by the planar body of the separator, a pair of the side walls of the separator and the air electrode, the partition wall is joined to the planar body of the separator and the air electrode.

In the present invention, a plurality of the cell units are assembled together by arranging the cell units in a power-generating chamber at a given interval in the state that the fuel electrodes and the openings of the plural cell units are directed in respectively uniform directions, the fuel electrodes and the separators of the adjacent cell units are connected in series with heat-resistive conductors which do not interrupt flowing of the gas, and the separators of the adjacent cell units are connected in parallel with the heat resistive conductors which do not interrupt the flowing of the gas. The oxidizing gas is supplied into the oxidizing gas flow paths of the cell units, and the fuel gas is supplied into the power generating chamber.

The present invention still further relates to the power generator including a plurality of the cell units having oxidizing gas flow paths provided inside the cell units, opened at opposite ends in a longitudinal direction of the cell units and also having at least the fuel electrode films on surfaces of the cell unit bodies, wherein at least a fuel gas chamber, an oxidizing chamber, a power-generating chamber and a combustion chamber are provided in the power generator; the power-generating chamber is divided into a power-generating area and a preheating area; a plurality of the cell units are arranged in the power-generating chamber at a given interval such that the fuel electrode films and the openings of the cell units may be directed to substantially the respectively uniform directions, the adjacent cell units are connected in parallel and in series with the heat-resistive conductors which do not interrupt flowing of the gas; the oxidizing gas chamber and the preheating chamber are separated by a gas-tight partition wall; the cell units are gas-tightly sealed relative to the gas-tight partition wall; the fuel gas inside the fuel chamber is supplied into the combustion chamber through the preheating area and the power-generating area; and the oxidizing gas is supplied into the combustion chamber through the oxidizing gas flow paths.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 3 is a plane view of the cell element 2 as viewed from a side of a fuel electrode film 4;

FIG. 4 is a sectional view of the separator 1A and the cell element 2 before joining;

FIG. 5 is a sectional view of a cell unit 7A;

FIG. 6 is a sectional view of another cell unit 7B;

FIG. 8 is a partially sectional view of the power generator in FIG. 7 cut in a longitudinal direction of the cell units 7A;

FIG. 9 is a sectional view of still another cell unit cut in a width direction;

FIG. 10 is a perspective view of another separator 35A;

FIG. 11 is a plane view of a cell element as viewed from a side of the fuel electrode 32;

FIG. 12 is a plane view of the cell element as viewed from a side of the air electrode 32;

FIG. 26 is a sectional view of a still further cell unit to which the present invention is applicable.

DETAILED DESCRIPTION OF THE INVENTION

Figure 1:
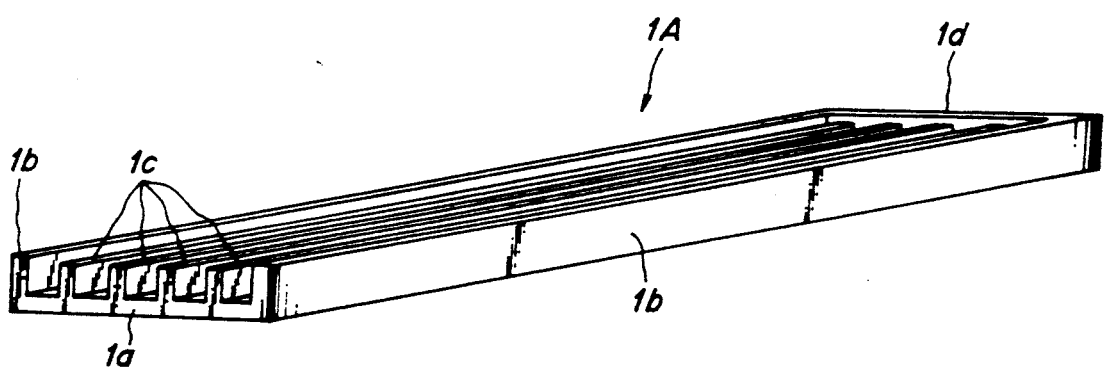
FIG. 1 is a perspective view of a separator 1A.

The present invention will be explained successively first with reference to FIGS. 1–8. FIG. 1 is a perspective view of the separator 1A. The separator has a rectangular shape as viewed in plane, and the ratio of a long side to a short side of the rectangular shape is not less than 2.

Slender projections 1b are formed, in parallel to each other, along the edge portions of the two long sides among the four sides of the separator 1A. One short side is formed with a slender projection 1d, and two ends of the projection 1d continue to ends of the projections 1b, respectively. An outer frame of the separator 1A is constituted by a flat board body 1a having a rectangular parallelopiped shape and two projections 1b, 1b as well as the projection 1d of the separator 1A. The surface of the flat board-shaped body 1a is formed with, for example, four rows of slender partition walls 1c in parallel to one another and to the projections 1b. One end of each of the partition walls 1c extends up to one end of the flat board body 1a, and the other end of the partition wall 1c continues to the projection 1d.

The separator 1A is made of a gas-tight electron conductor. Since the separator 1A is exposed to the oxidizing gas and the fuel gas, the separator must possess oxidation resistance and reduction resistance. As the material for the separator, $LaCrO_3$ ceramic, nickel-zirconia cermet coated with $LaCrO_3$ ceramic at a portion exposed to the oxidizing gas may be recited.

Figure 2:
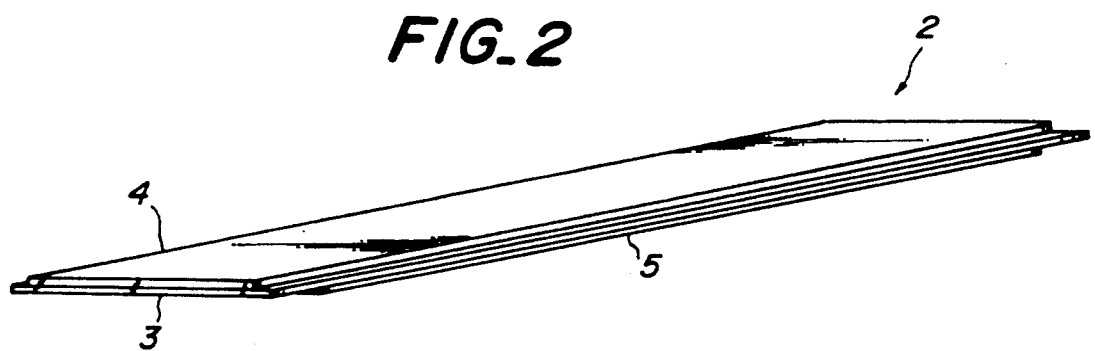
FIG. 2 is a perspective view of a cell element 2.

FIG. 2 is is a perspective view of the cell element 2. FIG. 3 is a plane view of the cell element 2 as viewed from a side of the air electrode film 4. The planar solid electrolyte 3 has substantially the same rectangular plane shape as that of the separator 1A. The air electrode film 4 is formed on one surface of the planar solid electrolyte 3, and the fuel electrode film 5 is formed on the other surface of the solid electrolyte 3.

Exposed portions 3a of the planar solid electrolyte 3 are formed along edge portions of the two long sides of the solid electrolyte, and an exposed portion 3b of the solid electrolyte is formed along an edge portion of the short side. The size of each of the exposed portions 3a is substantially equal to that of the projection 1b, and the size of the exposed portion 3b is substantially equal to that of the projection 1d. The planar solid electrolyte 3 must be gas-tight.

The air electrode film 4 may be made of $LaMnO_3$, $CaMnO_3$, $LaNiO_3$, $LaCoO_3$ or the like, which is doped or not doped. Among them, $LaMnO_3$ added with strontium is preferred. The planar solid electrolyte 3 may be generally produced from yttria-stabilized zirconia or the like. The fuel electrode film may be generally preferably produced from nickel-zirconia cermet or cobalt-zirconia cermet.

FIG. 4 is a sectional view illustrating the cell element 2 and the separator 1A before joining thereof. The air electrode film 4 of the cell element 2 is opposed to the projections 1c of the separator 1A. A joining ceramic powder layer 6 is provided on a surface of each of the projections 1b, 1c and 1d. The material of the powder layer 6 may be the same material as that of the air electrode film 4 or that of the separator 1A. Two projections 1b are contacted with the exposed portions 3a, the projection 1d is contacted with the projection 1d, and the projection 1c is contacted with the air electrode film 4. The cell unit assembly is fired in this state to obtain a cell unit 7A shown in FIG. 5.

Grooves between the adjacent projections 1c constitute oxidizing gas flow paths 8 in the cell unit 7A. One end of the oxidizing gas flow path 8 is opened to the outside of the cell unit 7A, and the other end is closed with the projection 1d. These oxidizing gas flow paths 8 are surrounded with the separator 1A and the planar solid electrolyte 3 both being gas-tight. Therefore, the oxidizing gas will not leak through a portion other than the openings of the oxidizing gas flow paths 8.

FIG. 6 is a sectional view of another cell unit 7B cut in a width direction of the cell unit similarly to FIG. 5. A cell element of the cell unit 7B is the same as that in FIG. 5. The separator 1B is the same as the separator 1A except that no projection 1c is present. In the separator 1B, slender square columnar partition walls 9 are provided on a surface of the flat board-shaped body instead of the projections 1C.

These partition walls 9 need not be made of a material resisting reducing atmosphere. The partition walls 9 may be made of a material being stable in air and having high electric conductivity, for example, lantanium manganite in which a part of an A site is replaced by an alkaline earth metal.

The partition walls 9 are arranged in parallel to one another as well as to the projections 1b, and the interval between the adjacent partition walls 9 is constant. Before the cell element 2 is joined to the separator 1B, slender rectangular columnar grooves are defined between the partition walls 9 and between the partition walls 9 and the projections 1b. The separator 1B is joined to the cell element 2, and each partition wall 9 is simultaneously joined to the air electrode film 4. Thereby, oxidizing gas flow paths 8 are formed by the above grooves, respectively.

Figure 7:
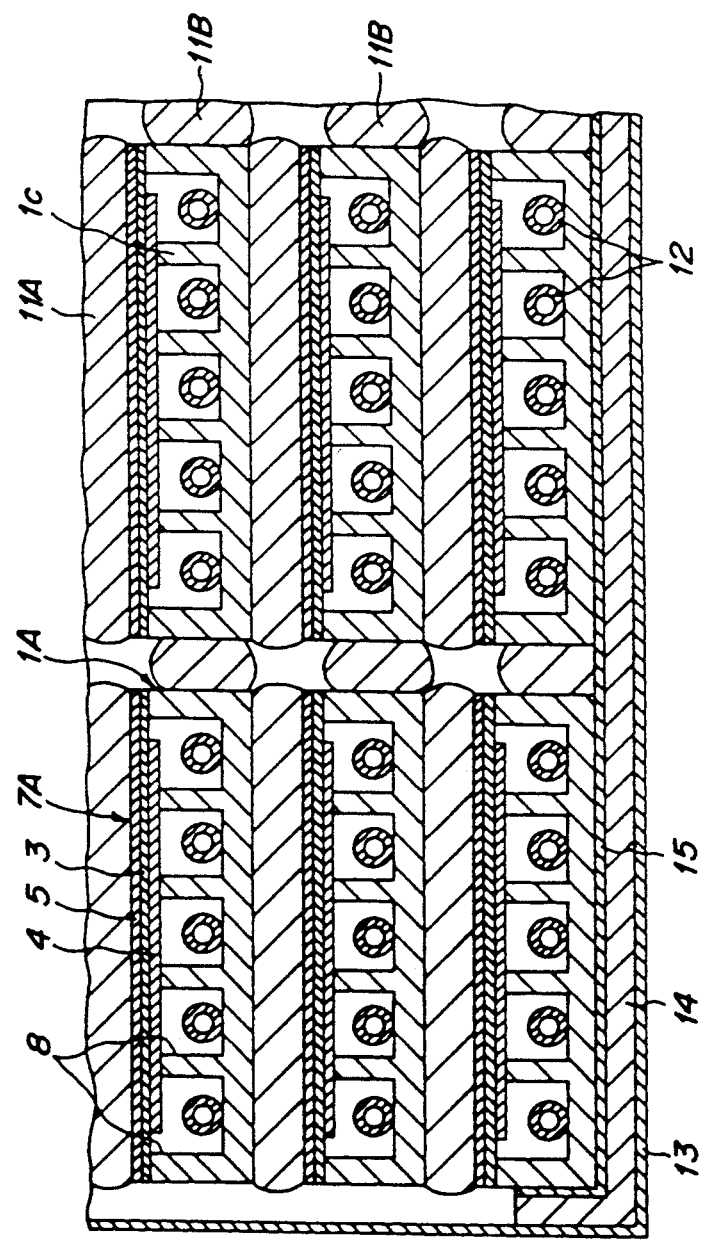
FIG. 7 is a sectional view of a part of a power generator in which the cell units 7A are assembled together.

Next, a construction example of a power generator in which the above-mentioned cell units are assembled together will be explained. FIG. 7 is a partially sectional view of the power generator cut in a width direction of the cell units. FIG. 8 is a partially sectional view of the power generator of FIG. 7 cut in the longitudinal direction of the cell units.

The entire power generator is housed in a container 13 having a substantially rectangular parallelopiped shape. A fuel gas chamber 17, a power generating chamber 18, a combustion chamber 19 and an oxidizing gas chamber 20 are provided inside the container 13. A through hole 13a of the container 13 communicates with the fuel gas chamber 17, and a through hole 13b communicates with the oxidizing gas chamber 20. A through hole 13c communicates the combustion chamber 19.

The fuel gas chamber 17 and the power-generating chamber 18 are divided by a partition wall 21, and fuel gas feed holes 21a are provided in the partition wall 21 at a given interval. The power-generating chamber 18 and the combustion chamber 19 are divided by a partition wall 16, and cell unit-inserting holes 16a are provided in the partition wall 16 at a given interval. The combustion chamber 19 and the oxidizing gas chamber 20 are divided by a partition wall 22, and through holes 22a are formed in the partition wall 22 at a given interval.

Each cell unit 7A is received in the power-generating chamber 18, and the projection 1d is butted to the partition wall 21 through an insulating ceramic felt material such as alumina felt. The end of each of the cell unit 7A on the side of the opening 1e is inserted into the cell unit-inserting opening 16a, and is exposed in the combustion chamber 19. As a result, each oxidizing gas flow path 8 is communicated with the combustion chamber 19. Between the inner periphery of the cell unit-inserting hole 16a and the outer periphery of the cell unit 7A is defined a slight space around the substantially entire periphery of the cell unit-inserting hole 16a. A ceramic felt material 24 such as alumina felt is filled into this space. Thus, the cell unit 7A is loosely held by the ceramic felt material 24.

A planar current-collecting plate 14 is arranged on a bottom of the power-generating chamber 18 of the container 13, and a current-collecting layer 15 is provided on the current-collecting plate 14. In this embodiment, the cell units 7A are extended in both vertical and lateral directions at given intervals. In FIG. 7, three lower vertical rows of the assembled cell units only and two left rows of the cell units are illustrated among the entire cell units due to the limitation of the dimension of the drawing. As a matter of course, the number of the cell units 7A involved in such a cell assembly may be appropriately selected.

The lowermost cell units are placed on the current-collecting layer 15 in the power-generating chamber 18. Since the current-collecting layer 15 needs to follow the shape or deformation of the cell unit 7A, it is preferable that the current-collecting layer is made of a material having elasticity and flexibility. Rows of the cell units 7A are placed successively on the lowermost cell units 7A at a given interval such that the fuel electrode film 5 of the cell unit is opposed to the flat board-shaped body 1a of the vertically adjacent cell unit. A heat-resistive conductor 11A is inserted between them, so that the fuel electrode film 5 of the cell unit is electrically contacted with the flat board-shaped body 1a of the vertically adjacent cell unit 7A.

In FIG. 7, a slender heat-resistive conductor 11B is inserted between the laterally adjacent cell units 7A. By so doing, the separators 1A of the cell units 7A are electrically connected together. The heat-resistive conductors 11A and 11B are not contacted with each other.

Cylindrical feed pipes 12 having substantially the same inner diameter as that of the through holes 22a in the partition wall 22 are fixed to the partition wall 22 at a given interval. An inner space of each of the feed pipes 12 is communicated with the oxidizing gas chamber 20 through the respective through holes 22a. Each feed pipe 12 is inserted into the oxidizing gas flow path 8 across the combustion chamber and through the opening 1e, and is supported on the flat board-shaped body 1a. The feed opening 12a at the tip of each of the feed pipes 12 is opposed to the projection 1d with a given space being left therebetween.

Next, the operation of this power generator will be explained with reference to FIG. 8. The oxidizing gas is fed from the outside of the container through the through hole 13b in a direction shown by an arrow A, and the oxidizing gas is fed into the feed pipe 12 through the oxidizing gas chamber 20 and the through hole 22a in a direction shown by an arrow B. Then, the oxidizing gas flows inside the feed pipe 12 in a direction shown by an arrow C, and is fed into the oxidizing gas flow path 8 through the feed opening 12a in a direction shown by an arrow D. The oxidizing gas immediately strikes against the projection 1d and changes its flowing direction as shown by an arrow D. Then, the oxidizing gas flows between the air electrode film 4 and the feed pipe 12, and is discharged into the combustion chamber 19 through the opening 1e.

On the other hand, the fuel gas is fed into the fuel gas chamber 17 from the outside of the container 13 through the through hole 13a in a direction shown by an arrow E, and then is fed into the power-generating chamber 18 through the fuel gas feed holes 21a. Thereafter, the fuel gas flows between the heat-resistive conductors 11A and 11B, and then through the ceramic felt material 24, and is discharged into the combustion chamber 19.

The oxidizing gas generates oxygen ions or the like at the interface between the air electrode film 4 and the planar solid electrolyte 3 during operation of the power generator. The generated oxygen ions or the like move to the fuel electrode film 5 through the planar solid electrolyte 3, and reacts with the fuel gas and discharges electrons to the fuel electrode film 5, so that potential difference is generated between the air electrode film 4 and the fuel electrode film 5 acting as the anode and the cathode, respectively. Such cell units are connected in series and in parallel as mentioned above, so that electric power is taken out through the current-collecting member 14.

The power generator is designed such that the fuel gas slightly flows into the combustion chamber 19 due to slight difference in pressure between the power-generating chamber 18 and the combustion chamber 19 so as to prevent the back flow of the fuel gas from the combustion chamber 19 to the power generating chamber 18. Steam, carbon dioxide, etc. produced in the above reaction are contained in the fuel gas having passed through the power-generating chamber 18, and the content of the fuel itself is reduced. In the combustion chamber 19, the remaining fuel gas is burnt with the oxidizing gas remained after the reaction. Fresh oxidizing gas flowing through the feed pipe 12 is preheated with this combustion heat. The combustion exhaust gas is discharged through the through holes 13c in a direction shown by an arrow G.

As the fuel gas, a gas containing a fuel such as hydrogen, reformed hydrogen, carbon monoxide, hydrocarbon or the like may be used. As the oxidizing gas, a gas containing oxygen may be used.

According to the above embodiment of the present invention, the following effects can be attained. (1) Since the cell element 2 is in the form of a flat board, the power-generating area can be greatly increased and an power-generated amount per unit volume can be increased, as compared with a cylindrical type SOFC (Japanese patent application Laid-open No. 57-11,356, etc.) which is said to be most practical at present. (2) The planar solid electrolyte 3 can be formed by using the tape casing process or the press molding process. That is, it is unnecessary to provide the solid electrolyte film by the gas phase process such as the electrochemical vapor deposition process (EVD) or the chemical vapor deposition process (CVD) unlike the production of the cylindrical cell unit. Therefore, the productivity of the solid electrolyte can be increased, and the production cost can be reduced, as compared with the conventional process.

In view of the above, the thickness of the planar solid electrolyte film 3 is preferably not less than 10 $\mu$m but not more than 500 $\mu$m, and more preferably not less than 50 $\mu$m but not more than 100 $\mu$m. (3) The separator 1A is provided with a plurality of the projections 1C, which are connected to the air electrode film 4. By so doing, since the current path is formed through the projections 1C from the air electrode film 4, the distance by which current flows through and in parallel to the air electrode film 4 is shortened. As a result, since the internal resistance inside the air electrode film 4 is reduced, the output of the cell unit can be increased.

(4) As mentioned before, since each projection 1C is joined to the planar cell element 2, the structural strength is high. Therefore, reliability is improved from the stand point of the cell unit level and the integrated cell level. The reason is that the cell unit 7A has a multichannel structure, that is, a structure in which a small rectangular columnar bodies are combined, and the dense ceramic functions as a substantial support.

(5) As mentioned before, the pressure inside the power-generating chamber 18 is made greater than that in the combustion chamber 19 so that the fuel gas is flown in one way direction. Further, the oxidizing gas is flown in one way direction from the oxidizing gas flow path 8 to the combustion chamber 19. Therefore, it is unnecessary to gas-tightly or rigidly seal the four sides of the cell unit 7A relative to the cell unit-inserting hole 16a. Thus, neither strain nor stress occurs in the cell unit 7A due to the fixing and sealing, and the reliability increases as the structural body.

(6) In addition, each cell unit 7A is held and located by the heat-resistive conductors 11A and 11B not interrupting the flowing of the gas and the ceramic felt material 24 in a soft-holding manner. By so doing, stress acting upon the cell unit 7A further decreases even under application of thermal expansion upon the cell unit 7A.

(7) Since the power-generating chamber 18 is provided between the fuel gas chamber 17 and the combustion chamber 19, the oxidizing gas contacts the used fuel gas having the content of the fuel reduced and containing much stream, etc. in the combustion chamber 19. Therefore, neither rapid combustion nor rapid heat generation locally occur near the openings 1e. Accordingly, it is not feared that the end portion of the cell unit cracks due to the locally rapid combustion or heat generation.

In the illustrated embodiment, the cell unit having the rectangular sectional shape is used. However, a cell unit having a parallelogram sectional shape or a rhombic sectional shape may be employed. In such cases, the ratio of the long side to the short side is preferably set at not less than 2.

The sectional area of each oxidizing gas flow path cut in the width direction is preferably 0.1 to 2 $cm^2$.

This is because if the sectional area is less than 0.1 $cm^2$, it is difficult to provide the oxidizing gas-introducing pipe. On the other hand, if the sectional area is more than 2 $cm^2$, the volume of the oxidizing gas inside the cell unit is so large that the oxidizing gas needs to be introduced in an amount greater than necessity.

It is preferable that the heat-resisting current collector not interrupting the flowing of the gas is made of a felt material formed by knitting heat-resistive metallic fibers or a spongy material having numerous open cells. As the metal, nickel is preferred. In order to produce the spongy material, for example, the heat-resistive metallic powder is kneaded with a foaming agent and a binder, and the kneaded material is shaped, and the shaped body is fired.

According to the present invention, since the cell unit is in the form of the flat board, the power-generating area can be made far greater and the power-generating amount per unit volume can be made greater, as compared with the cylindrical SOFC. Further, since the planar solid electrolyte can be formed by the tape casting process or the press molding process, the productivity of the solid electrolyte can be improved and the production cost thereof can be lowered, as compared with the cylindrical SOFC requiring that the solid electrolyte film needs to be formed by using the EVD or the like.

In addition, the slender projections are formed from the dense electron-conductive ceramic on three edge portions of the separator, and these slender projections are gas-tightly joined to the three sides of the planar solid electrolyte. Therefore, the cell unit is gas-tightly sealed at three sides, so that the oxidizing gas can be fed into the oxidizing gas flow path through the remaining side. Thus, different from the planar SOFC, it is unnecessary that the entire periphery of the cell unit is gas-tightly sealed or rigidly fixed to a given position. Further, since the cell units are connected through the heat-resistive conductors having elasticity, strain or stress is not applied to the cell units due to the fixing or the sealing. Thus, reliability of the cell units is high.

Furthermore, since the separator is formed with a plurality of the grooves and these grooves constitute the respective oxidizing gas flow paths, current can be flown vertically from the surface of the air electrode film through the partition walls (projections) between the adjacent grooves. By so doing, the distance by which the current flows through and in parallel to the air electrode film can be greatly shortened. As a result, since the internal resistance inside the air electrode film can be reduced, the output of the cell unit can be improved. Further, since the multi-channel structure is constituted by the dense material, the structural strength of the cell unit can be largely improved and the reliability of the cell unit as the stack can be enhanced, as compared with the conventional flat board-shaped SOFC.

Next, embodiments according to the second aspect of the present invention will be explained with reference to FIGS. 9 through 16. FIG. 9 illustrates a cell unit 31A including a cell element and a separator 35A, and FIG. 10 illustrates the separator 35A. The separator 35A has a rectangular plane shape, and the ratio of the long side to the short side is preferably not less than 2.

A pair of slender side walls 35h are formed on surfaces of edge portions of a planar body 35a having the rectangular plane shape in a width direction thereof. These side walls 35h have a rectangular columnar shape, and extend from one end to the other of the separator in a longitudinal direction. Between the side walls 35h are provided, for example, totally three rows of parallel partition walls 35b which have a rectangular columnar shape and extend from one end to the other of the separator in the longitudinal direction. An end partition wall 35c having a rectangular columnar shape is formed at one end of the separator 5A as viewed in the longitudinal direction. The end partition wall 35C is continued to the partition walls 35b and 35h. Totally four rows of parallel oxidizing gas flow paths 36 are defined between the partition walls 35b and the side walls 35h. One end of each of the oxidizing gas flow paths 36 is closed with the partition wall 35c as mentioned later. The other end of each oxidizing gas flow path 36 is opened. The height of each of the partition walls 35b is set at substantially the same level of the height of the end partition wall 35c.

The separator 35A is made of a gas-tight electron conductor. Further, since the separator 35A is exposed to the oxidizing gas and the fuel gas, the separator must have oxidation resistance and reduction resistance. As the material for the separator, $LaCrO_3$ ceramic and nickel-zirconia cermet coated with $LaCrO_3$ ceramic at a portion to be exposed to the oxidizing gas may be recited.

FIG. 11 is a plane view of the cell element as viewed from a side of a fuel electrode 32. FIG. 12 is a plane view of the cell element as viewed from a side of an air electrode 34A.

A dense solid electrolyte 33 has substantially the same plane shape as that of the separator 35A. The fuel electrode film 32 having a rectangular plane shape is formed on a surface of the solid electrolyte plate 33.

On a surface of the solid electrolyte 33 opposite to the fuel electrode 32 is similarly formed the air electrode 34 having the rectangular plane shape. A pair of slender projections 33a and a slender projection 33b are formed along peripheral edges of the solid electrolyte upon which no air electrode is present. These projections 33a, 33a and 33b constitute a part of the solid electrolyte 33. Widthwise side faces 34a of the air electrode 34 are covered with the projections 33a, and are not exposed to the outside. An end side face of the air electrode film 34A in the longitudinal direction is also covered with the projection 33b, and is not exposed to the outside.

Figure 13:
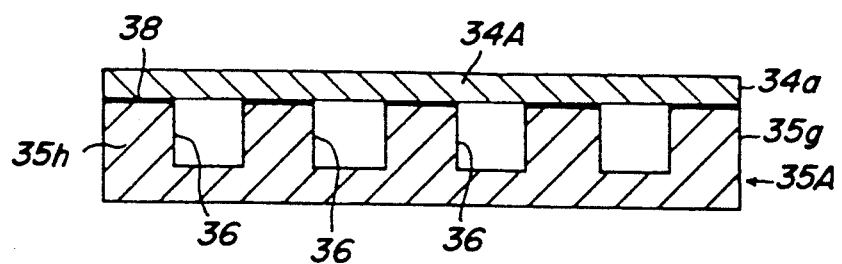
FIG. 13 is a sectional view illustrating an air electrode 34A and a separator 35A before joining.

Next, a preferable production procedure of this cell unit will be explained with reference to FIG. 13.

The air electrode 34A may be made of $LaMnO_3$, $CaMnO_3$, $CaNiO_3$, $LaCoO_3$ or the like which is doped or not doped. Among them, $LaMnO_3$ added with strontium is preferred. The air electrode is preliminarily fired to given a porosity of 20-35%, and joined to the separator 35A separately formed. When joining them, the air electrode 34A are opposed to the partition walls 35b and 35c and the side walls 35h. A joining ceramic powder layer 38 is provided on a surface of each of the partition walls 35b, 35c and the side walls 35h. The material of the ceramic powder layer 38 may be the same as that of the air electrode 34A or the separator 35A. The air electrode and the separator are thermally treated in the state that the partition walls 35b and 35c and the side walls 35h are contacted with the air electrode 34A, thereby obtaining a laminate consisting of the air electrode and the separator (interconnector).

Figure 14:
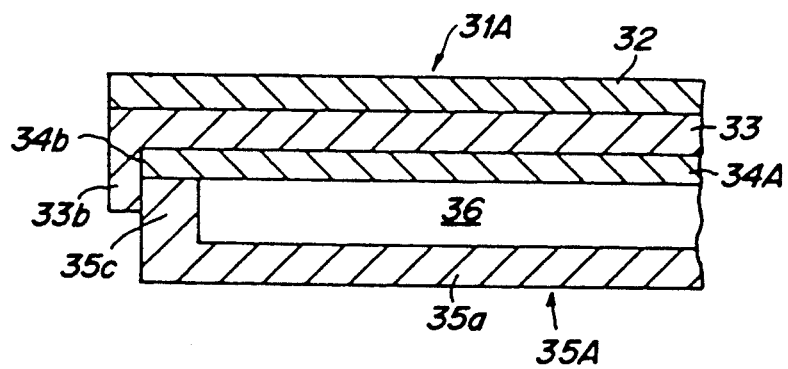
FIG. 14 is a sectional view of illustrating a sealed peripheral end portion of the cell element.

The solid electrolyte 33 is formed in the above-mentioned shape to cover the air electrode 34A, the air electrode of the separator laminate and the interface between the air electrode and the separator. The solid electrolyte may be formed, for example, by flame spraying or plasma spraying. The fuel electrode film 32 is formed on the surface of the solid electrolyte 33 as shown in FIG. 11. Thereby, the cell unit 31A as shown in FIGS. 9 and 14 can be produced.

In this cell unit 31A, one end of the oxidizing gas flow path 36 is closed with the end partition wall 35c. The side face 34a of the air electrode 34A and a part of the outer wall face 35g of the separator 35A in the width direction are covered with the slender projection 33a. The side face 34b of the end of the air electrode 34A in the longitudinal direction and a part of the outer wall face 35c of the end partition wall 35C are covered with the slender projection 33b. The oxidizing gas flow path 36 and the side faces 34a and 34b of the air electrode 34A are surrounded with the separator 35A and the solid electrolyte 33 both being gas-tight. Therefore, the oxidizing gas will not leak through a portion other than the opening of the oxidizing gas flow path 36.

Figure 15:
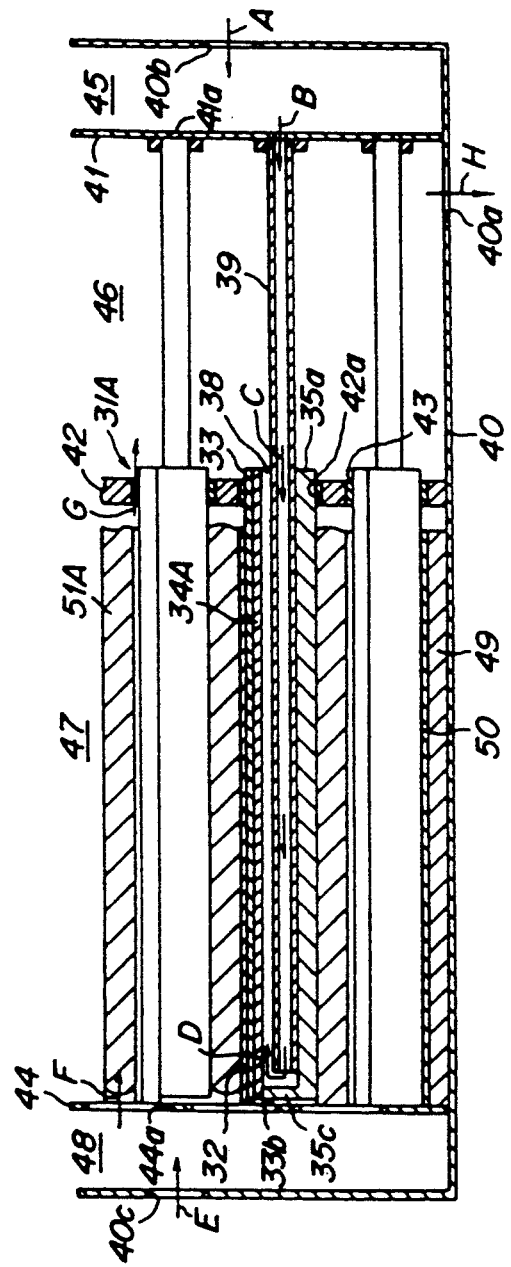
FIG. 15 is a partially sectional view of a part of a power generator in a longitudinal direction of cell units.
Figure 16:
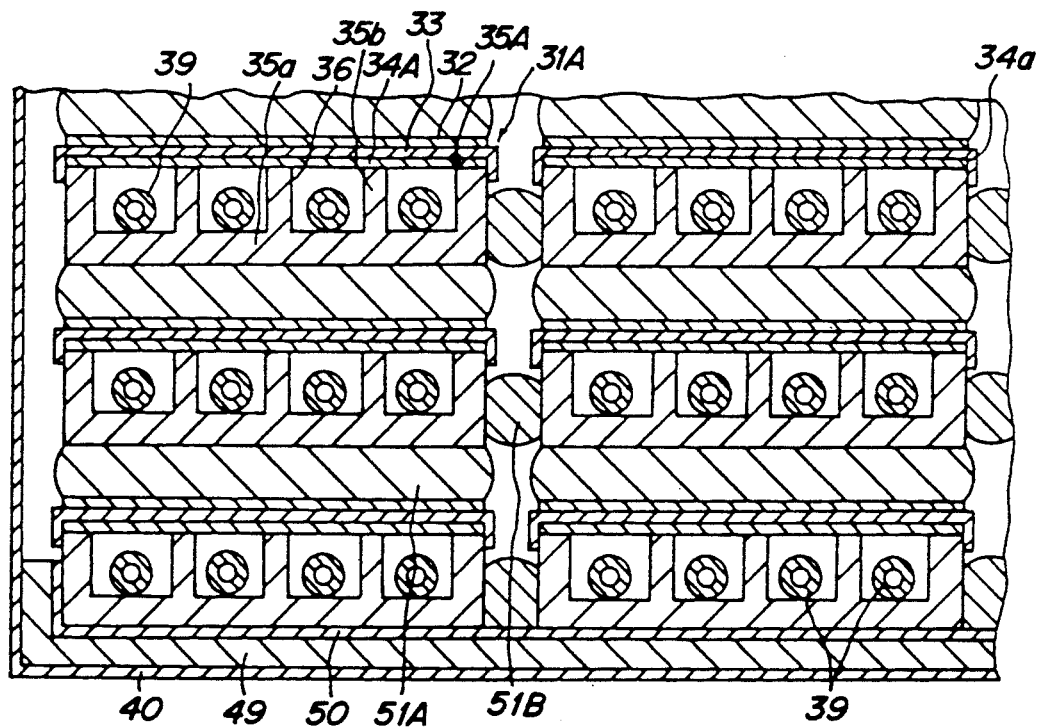
FIG. 16 is a sectional view of a part of the power generator cut in a width direction of the cell units.

Next, a construction example of a power generator in which the above-mentioned cell units are assembled together will be explained. FIG. 15 is a partially sectional view of the power generator cut in a longitudinal direction of the cell units. FIG. 16 is a sectional view of a part of the power generator cut in a width direction of the cell units.

The entire power generator is housed in a container 40 having a substantially rectangular parallelopiped shape. A fuel gas chamber 48, a power-generating chamber 47, combustion chamber 46 and an oxidizing gas chamber 45 are provided inside the container 40. A through hole 40c, a through hole 40b and a through hole 40a provided in the container 40 communicate with the fuel gas chamber 48, the oxidizing gas chamber 45, and the combustion chamber 46 respectively.

The fuel gas chamber 48 is separated from the power-generating chamber 47 by a partition wall 44. Fuel gas feed holes 44a are provided in the partition wall 44 at a given interval. The power-generating chamber 47 is separated from the combustion chamber 46 by a partition wall 42. Cell unit-inserting holes 42a are provided in the partition wall 42 at a given interval. The combustion chamber 46 is separated from the oxidizing gas chamber 45 by a partition wall 41, and through holes 41a are provided in the partition wall 41 at a given interval.

Each cell unit 31A is housed in the power-generating chamber 47, and an end of the cell unit 31A is butted to the partition wall 44 through an insulating ceramic felt material such as alumina felt. The other end of each cell unit 31A on a side of the opening 38 is passed through the cell unit-inserting opening 42a and exposed to the combustion chamber 46. As a result, each of the oxidizing gas flow paths 36 communicates with the combustion chamber 46. A slight gap is formed between the cell unit-inserting hole 42a and the outer periphery of the cell unit 31A around substantially the entire peripheral surface of the cell-inserting hole 41a, and a buffer material 43 is filled in this gap. As a result, an end of each cell unit 31A is loosely held through the buffer material 43. As the buffer material 43, the ceramic felt material such as alumina felt is preferred.

A planar current-collecting plate 49 is placed on a bottom of the power-generating chamber 47 of the container 40, and a layer 50 of a current-collecting material 50 is provided on the current-collecting plate 49. In this embodiment, the cell units 31A are arranged in vertical and lateral directions at given intervals. In FIG. 16, three lower rows and two left rows of the cell units only are shown among those of the integrated cell due to the dimensional limitation on the drawing. As a matter of course, the number of the cell units 31A contained in the integrated cell may be appropriately selected.

The lowermost cell units 31A are placed on the current-collecting layer 50 inside the power-generating chamber 47. In order for the current-collecting layer 50 to follow the shape or deformation of the cell unit 31A, the current-collecting layer 50 preferably possesses elasticity and flexibility. Other cell units 31A are successively arranged above on the lowermost cell units 31A at a given interval, while the fuel electrode 32 of the cell unit 31A is opposed to the flat board-shaped body 35a of the vertically adjacent cell unit 341A. Heat-resistive conductors 51A having a form of substantially flat board are inserted between the adjacent cell units 31A, so that the fuel electrodes of the cell units 31A are electrically connected to the flat board-shaped bodies of the vertically adjacent cell units, respectively.

In FIG. 16, slender heat-resistive conductors 51B are inserted between the laterally adjacent cell units 31A. By so doing, the separators 35A of the cell units 31A are electrically connected. In this case, the heat-resistive conductors 51A are prevented from contacting the heat-resistive conductors 51B.

Cylindrical feed pipes 39, which have substantially the same inner diameter as that of the through hole 41a of the partition wall 41a, are fixed to the partition walls 41 at a given interval. The interior space of each of the feed pipes 39 is communicated with the oxidizing gas chamber 45 through the through hole 41a. Each feed pipe 39 passes through the combustion chamber 46, and is inserted into the oxidizing gas flow path 36 through the opening 38. The feed pipe 39 is supported on the flat board-shaped body 5a. A feed opening at the tip of each feed pipe 39 is opposed to the end partition wall 35c.

Since the operation of this power generator is substantially the same as that of the power generator shown in FIGS. 7 and 8, explanation thereof is omitted. In the embodiment illustrated in FIGS. 15 and 16, a fuel such as hydrogen, reformed hydrogen, carbon monoxide or hydrocarbon may also be used as the fuel gas as in the embodiment of FIGS. 7 and 8. As the oxidizing gas, a gas containing oxygen may be used.

In the embodiment of FIGS. 15 and 16, substantially the same effects as recited in (1) through (7) in connection with FIGS. 1-8 can be obtained.

Next, still another embodiment of the present invention will be explained.

Figure 17:
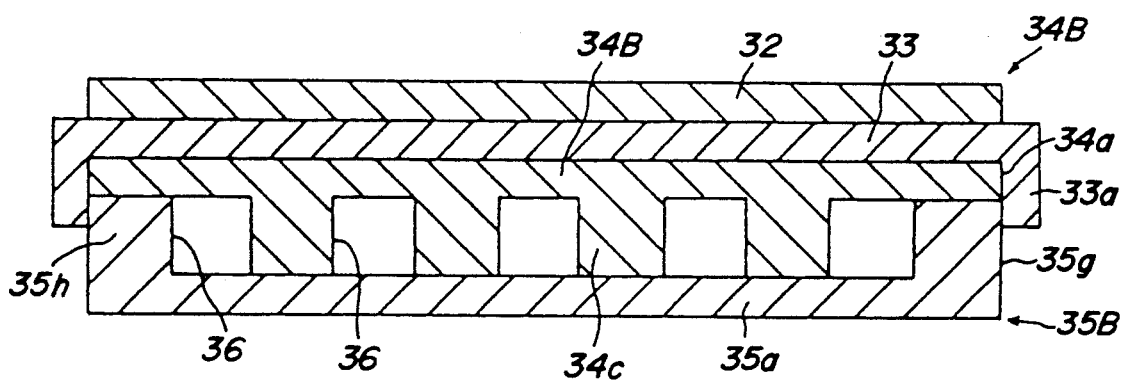
FIG. 17 is a sectional view of a cell unit 31B cut in a width direction thereof.

FIG. 17 is a sectional view of still another cell unit 31B cut in a width direction of the cell unit as in the same way in FIG. 9. In this embodiment, the construction and the production process of a solid electrolyte 33 and a fuel electrode 32 are the same as those in the embodiment of FIGS. 9-14. But, the the shapes of an air electrode 34B and a separator 35B differ from those in the latter embodiment. That is, side walls 35h are provided on both edges in the width direction of a flat board-shaped body 35a of the separator 35B, respectively. Further, the air electrode 34B is provided with a plurality of partition walls 34c. By joining the side walls to the air electrode and joining the partition walls of the air electrode to the separator, oxidizing gas flow paths 36 are defined among the side walls 35h and the partition walls 34c, respectively.

The other construction of the unit cell 31B having such a widthwise sectional structure may be substantially the same as those of the cell unit 31A.

Now, explanation will be made of a still further embodiment of a cell unit in which oxidizing gas flow paths are opened in opposite directions, and a collected state of such cell units.

Figure 18:
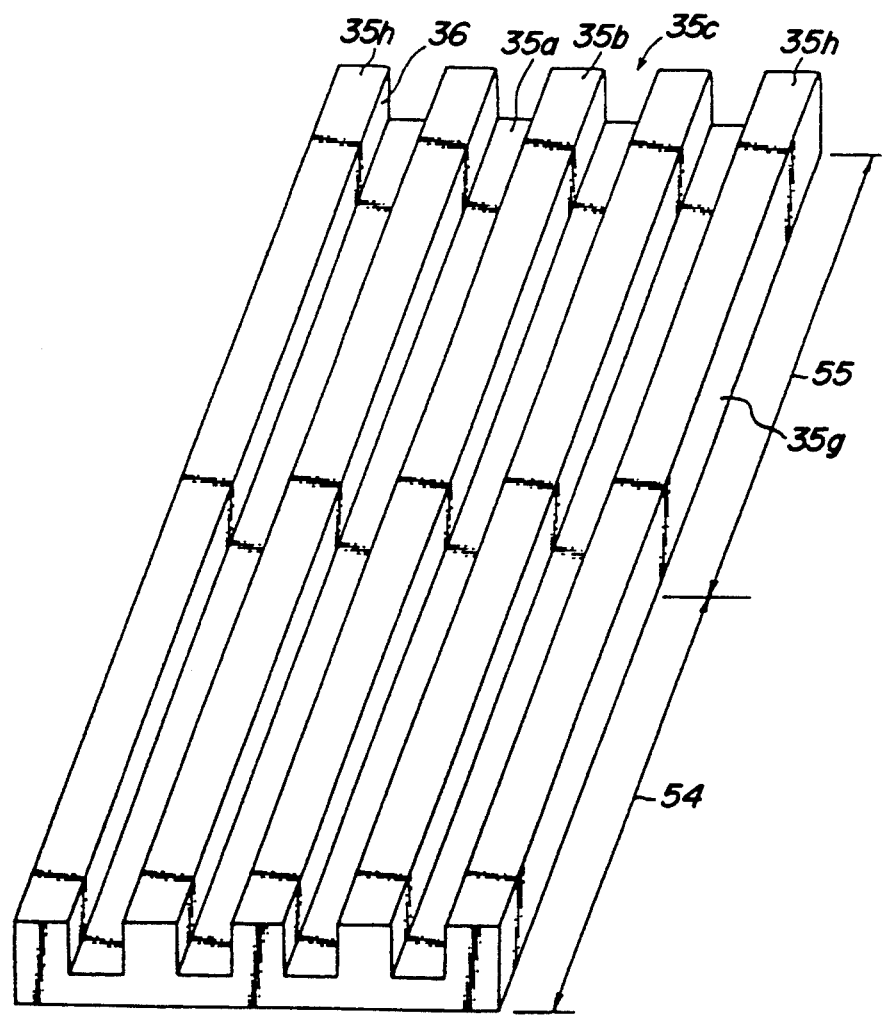
FIG. 18 is a perspective view of a separator 35C.
Figure 19:
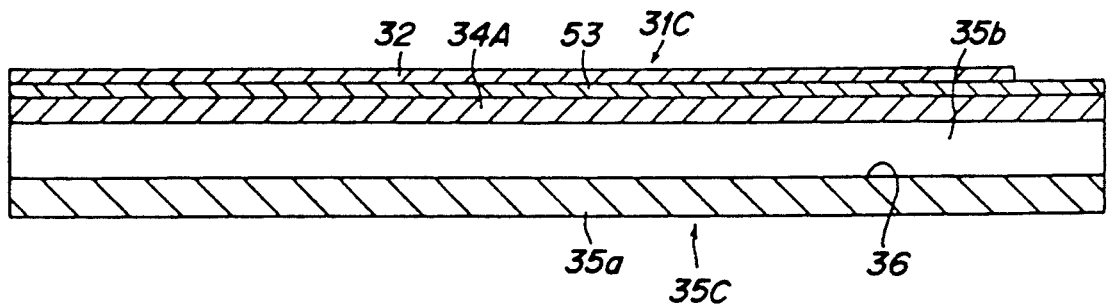
FIG. 19 is a sectional view of a cell unit 31C cut in a longitudinal direction thereof.

FIG. 18 shows a perspective view of a separator 35C used in this cell unit 31C, and FIG. 19 is a sectional view of the cell unit 31C cut in a longitudinal direction thereof.

In this separator 35C, a pair of side walls 35h and for example, three rows of partition walls 35b are formed in parallel on a surface of a flat board-shaped body 35a. In this embodiment, each of the partition walls 35b and the side walls 35h extend from one end and to the other of the separator as viewed in a longitudinal direction. Each of the partition wall 35b has a rectangular columnar shape, and oxidizing gas flow paths 36 also each having a rectangular columnar shape are also defined among the partition walls 35b and the side walls 35h. Each oxidizing gas flow path 36 linearly extends from one end to the other end of the separator in the longitudinal direction. In FIG. 18, reference numerals 54 and 55 indicate a preheating area and a power-generating area, respectively, which will be described later.

An air electrode 34A has substantially the same plane shape as that of the separator 35C, and is joined to end surfaces of the partition walls 35b and the side walls 35h. A solid electrolyte 53 is provided on a surface of the air electrode 34A, and a fuel electrode 32 is formed on a surface of the solid electrolyte 53. The cell unit 31C has substantially the same widthwise sectional shape as that of the cell unit 31A shown in FIG. 9. The oxidizing gas flow paths 36 are opened at opposite ends as viewed in the longitudinal direction of the cell unit 31C. The air electrode 34A is covered with the solid electrolyte 53 in the width direction of the separator 35C as in the same manner of FIG. 9, but the air electrode 34A is not covered with the solid electrolyte 53 at the opposite ends as viewed in the longitudinal direction of the separator 35C. Since these openings are exposed to an oxidizing gas chamber or a combustion chamber, the surface of the porous air electrode 34A need not be covered with a dense material there.

Figure 20:
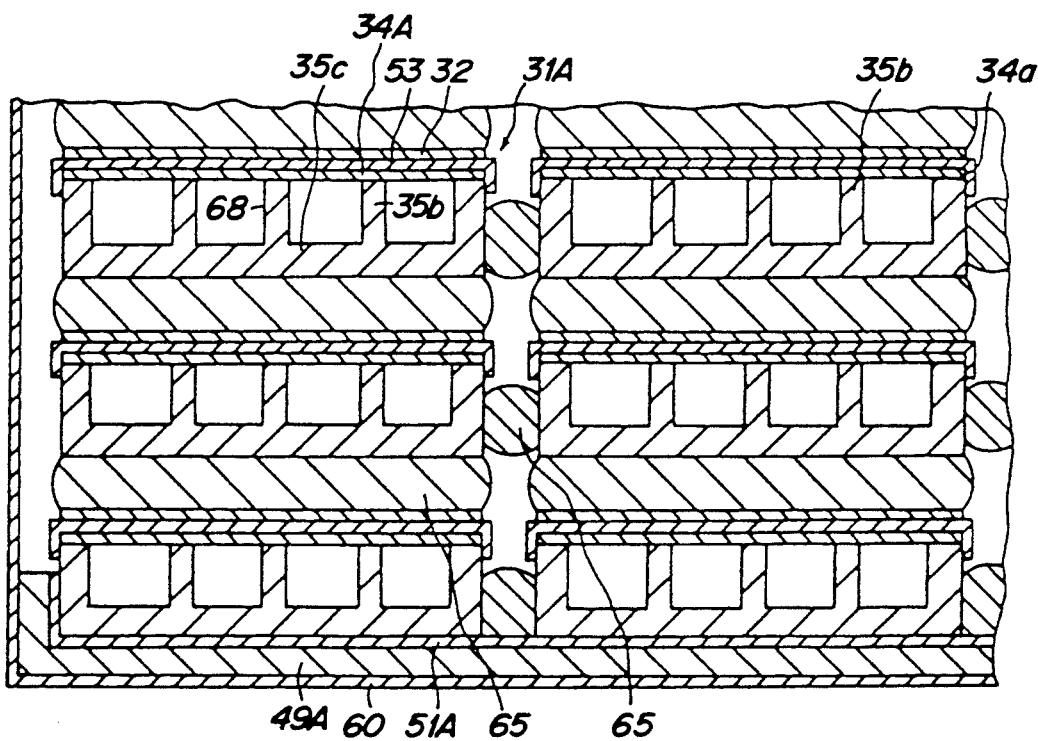
FIG. 20 is a sectional view of a part of another power generator cut in a longitudinal direction of unit cells.
Figure 21:
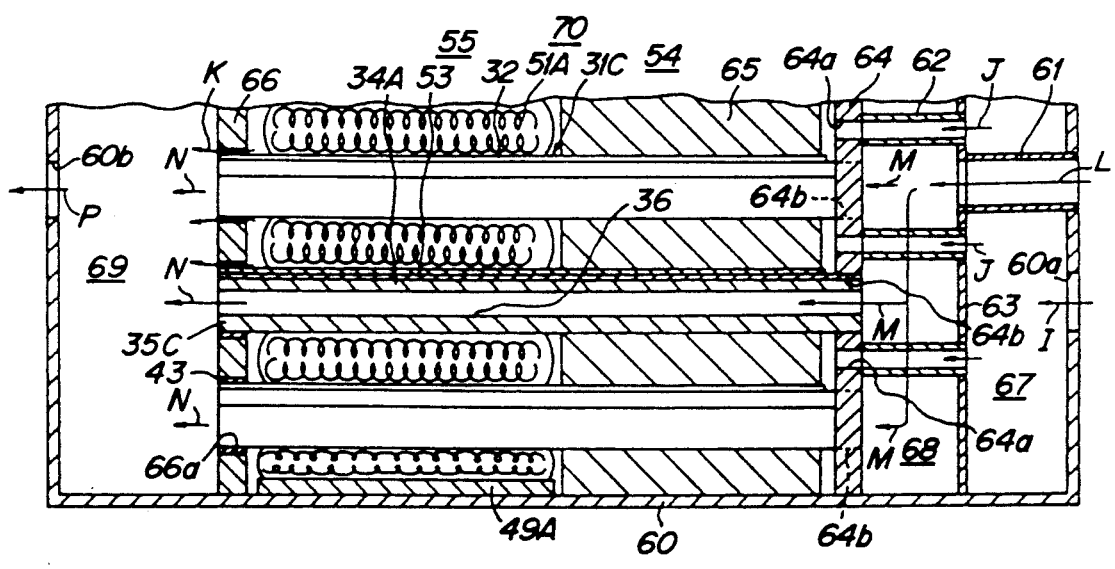
FIG. 21 is a sectional view of a part of the power generator of FIG. 20 cut in a longitudinal direction of the cell units 31C.

FIGS. 20 and 21 are sectional views of a part of a power generator in which such cell units 31C are assembled together. In FIG. 20, only three lower rows and two left rows of the cell units 31C are shown in the power generator due to the dimensional limitation of the drawing. In FIG. 21, only three lowermost rows of the cell units are shown.

Through holes 60a and 60b are provided in opposite side walls of a container 60 having a substantially rectangular parallelopiped shape and made of a dense material. A fuel gas chamber 67, an oxidizing gas chamber 68, a power-generating chamber 70 and a combustion chamber 69 are provided inside the container 60 successively from the right side in FIG. 21. The combustion gas chamber 37 is separated from the oxidizing gas chamber 68 by a gas-tight partition wall 33, and the oxidizing gas chamber 68 is separated from the power-generating chamber 70 by a gas-tight partition wall 64.

The power-generating chamber 70 is separated from the combustion chamber 69 by a partition wall 66.

The power-generating chamber 70 is divided into a preheating area 54 and a power-generating area 55. The preheating area 54 is located on a side of the partition wall 64, and the power-generating area is located on a side of the partition wall 66. A feed pipe 61 passes through the fuel gas chamber 67, and an inner space of the feed pipe 61 is communicated with the oxidizing gas chamber 68. Through holes 64a and cell unit-inserting holes 64b are formed in the gas-tight partition wall 64. Feed pipes 62 passes through the oxidizing gas chamber 68, and an inner space of each of the feed pipes 66 is communicated with the fuel gas chamber 67. The inner diameter of each of the feed pipes 62 is substantially equal to that of the through hole 64a, and each feed pipe 62 is positionally conformed to the through hole 34a. Each through hole 34a faces the preheating area 54.

The shape and the dimensions of the cell unit-inserting hole 64b are substantially the same as those of the cell unit 31C as viewed in the width direction. In FIG. 21, one cell unit 31C is shown in a section view, and two cell units 31C are each shown in a plane view for convenience of the illustration. Accordingly, in FIG. 20, one of the through holes 64b is shown in section, and the other two are shown by dotted lines. The cell unit-inserting holes 64b are regularly provided between the through holes 64a. The cell unit-inserting holes 66a are regularly provided in the partition walls 66 at a given interval. The dimension of each cell unit-inserting hole 66a is slightly greater than that of the cell unit 31C as viewed in the width direction thereof.

One end of each cell unit 31C is inserted into the cell unit-inserting hole 66b, and the other end is inserted into the cell unit-inserting hole 66a. By so doing, each cell unit 31C is held between the partition walls 64 and 66. Sealing is gas-tightly effected between the cell unit 31C and the cell unit-inserting hole 64b so that neither the fuel gas nor the oxidizing gas may leak therethrough. In order to effect such a gas-tight sealing, it is proposed that a gasket is used or a gap between the cell unit and the cell unit-inserting hole is sealed with an organic resin.

A slight gap exists between the inner peripheral surface of the cell unit-inserting hole 66a and the outer peripheral surface of the cell unit 31C around the entire periphery of the cell unit-inserting hole 66a. A buffer material 43 which does not interrupt flowing of the gas is filled in this gap. The left end of the cell unit 31C as viewed in FIG. 21 is loosely supported by the partition wall 66 through a buffer material 43.

In the preheating area 54, the gas-permeable insulating material 65 is filled in spaces defined between the vertically adjacent cell units 31C and between the laterally adjacent cell units 31C. Therefore, the heat-insulating material 65 functions as a supporting material for the cell units.

The power generating area 55 has the same construction as that shown in FIG. 16. That is, the fuel electrode 32 of the cell unit 31C is electrically connected to the separator 35C of the vertically adjacent cell unit 31C through the heat-resistive conductor 51A. The separator 35C of the lowermost cell unit 31C is electrically connected to the current-collecting plate 49A through the heat-resisting conductor 51A.

The operation of this power generator will be explained below.

The fuel gas is fed into the fuel gas chamber 67 through the through hole 60a in a direction of an arrow I, and fed into the feed pipes 62 in a direction of an arrow J. Then, the fuel gas passes the feed pipe 62, the through hole 34a and the preheating area 54, flows through the power-generating area 55, and then enters the combustion chamber 69 through the buffer material 43 in a direction of an arrow K.

On the other hand, the oxidizing gas enters the oxidizing gas chamber 68 through the feed pipe 61 in a direction of an arrow L, and flows into the oxidizing gas flow paths 36 in a direction of an arrow M. Then, the oxidizing gas successively passes through the preheating area 54 and the power-generating area 55, and enters the combustion chamber 69 in a direction of an arrow N. In the combustion chamber 69, the remaining fuel gas is burnt with the remaining oxidizing gas. Then, the combustion exhaust gas is discharged through the through hole 60b in a direction of an arrow P.

With respect to the cell unit and the power generator in this embodiment, the effects (1) through (7) recited in the embodiment of FIGS. 1-8 can be attained. However, the right end of the cell unit 31C is rigidly fixed in the power generator of FIGS. 20 and 21.

What is more important with respect to the cell unit 31C used in this embodiment is that one end of the oxidizing gas flow path 36 is not closed, and the opposite ends are opened. In addition, the separator 35C has such a shape as to make it relatively easy to shape by extrusion or the like. If one end of the oxidizing gas flow path 36 is closed, it will be relatively difficult to shape a separator having such a structure, and it will be relatively difficult to afford sufficient strength upon the closed end. Thus, the both end-opened cell unit 31C is so advantageous from the standpoint of the production technique.

The cell units 31C can be assembled together and well operated in the power generator having the construction shown in FIGS. 20 and 21. Since the thus constituted power generator has very peculiar characteristics, its function and effects will be explained in more detail.

What is important in the operation of the solid oxide fuel electrode is that the fuel gas is separated from the oxidizing gas. Therefore, sealing must be gas-tightly effected among the constituent parts. In order to effect such a gas-tight sealing, gaskets or an organic sealing material may be used.

However, the temperature inside the power-generating chamber rises up to 1,000° C. or so on operation. However, the above-mentioned gas-tightly sealing material is difficult to use at such a high temperature, because this gas-tight sealing material can withstand only temperatures of not more than around 500° C.

Therefore, a sealess structure making it unnecessary to use the above gas-tight sealing is employed in the power generator constructed as shown in FIG. 15. In order to realize such a sealess structure, one end of the cell unit 1A must be sealed with the partition walls 35c on the edge portion.

Different from this, the sealing is gas-tightly effected between the partition wall 64 and the end of the cell unit 31C in the case of this embodiment. In order to flow the fuel gas, no gas-tight sealing is necessary on the side of the partition wall 66. In this case, the power-generating area 55 is heated to high temperatures of around 1,000° C. For this reason, the preheating area 54 is formed by arranging the heat-insulating material 65 between the partition wall 64 and the power-generating area 62. As a matter of course, the temperature inside the preheating area 54 rapidly lowers toward the partition wall 64. In order to effect the above gas-tight sealing for the partition wall 64, the temperature of the sealed portion must be set far lower than that in the power-generating area 55, preferably set at for example, 500° C. or less. When the temperature of the sealed portion is set at not more than 350° C., the latitude of the kinds of the resin sealing materials to be selected can be widened. However, if the temperature is set at not more than 100° C., the length of the preheating area 54 needs to be increased, so that the amount of the power generated per unit volume decreases. Therefore, the temperature is preferably in a range of 100° C. to 350° C. The fuel gas and the oxidizing gas are preliminarily heated while passing the preheating area 54.

In the illustrated embodiment, as the heat-insulating material 35, porous alumina block, laminate of alumina felt sheets, or a composite material thereof may be used.

In the embodiment, the end of the cell unit 31C is inserted into the cell unit-inserting hole 64b. Instead of this, the terminal end face of the cell unit 31C is butted to the gas-tight partition wall 64 to make the gas-tight sealing therebetween. In this case, holes for the oxidizing gas need to be provided in the gas-tight partition wall 64.

In the cell unit shown in FIG. 19, no obstacle is provided in the oxidizing gas flow path 36, and no oxidizing gas is consumed for the generation of power in the preheating area 24.

Figure 22:
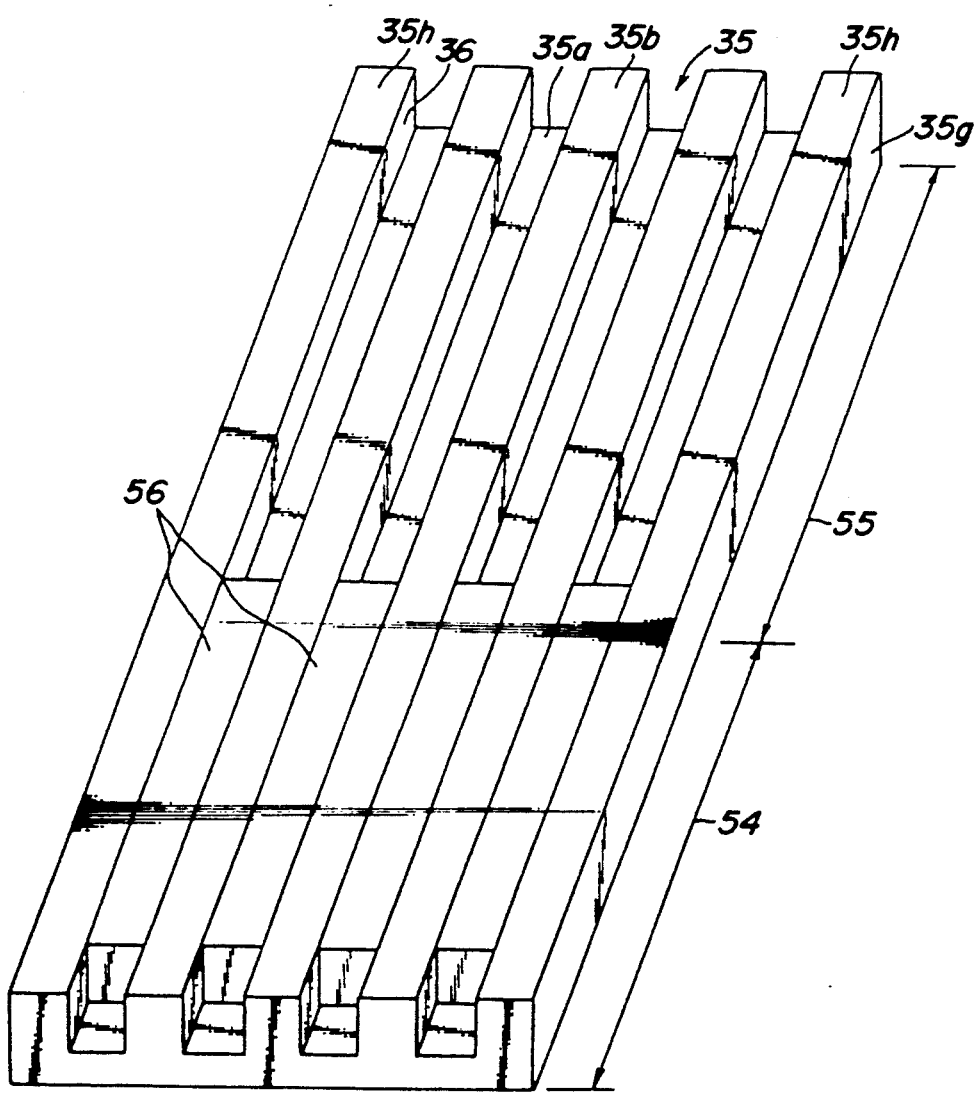
FIG. 22 is a perspective view of a separator 35C having a gas-permeable heat insulating material 56 filled inside oxidizing gas flow paths.

As shown in FIG. 22, the gas-permeable heat-insulating material 56 is filled in the preheating area 54. As the heat-insulating material 56, a ceramic porous material, ceramic fibers or the like may be preferably used. When the gas-permeable heat-insulating material 56 is filled in the preheating area 54, much heat in the power-generating area 55 can be effectively absorbed to improve the heat-insulating effect and further lower the temperature of the gas-tightly sealed portion. At the same time, while the oxidizing gas passes the heat-insulating material 56 having absorbed heat, the oxidizing gas can be more effectively preheated. For, the distance through which the oxidizing gas flows is prolonged as compared with the case where no heat-insulating material 56 is provided.

Further, a separator 35D shown in FIG. 22 may be used. In this separator 35D, a pair of side walls 35h are formed in parallel to each other on a surface of the separator in opposite end portions of the separator as viewed in the width direction. In a power-generating area 55, for example, totally three rows of rectangular columnar partition walls 35b are formed, between a pair of the side walls 35h, in the longitudinal direction of the separator and in parallel to one another. In the power-generating area, four rows of oxidizing gas flow paths 36 are formed in parallel to one another.

In the preheating area 24, the oxidizing gas flow paths are bent in a complex manner. First, totally three rows of partition walls 35f each having a rectangular columnar shape are extended alternatively from opposite sides of the separator 35D on an inlet side of the preheating portion of the cell unit, and are located in an area from one end of the separator toward the power-generating area. The partition walls 35f are parallel to one another, and extend in a direction orthogonal to the longitudinal direction of the separator 35D. One end of the partition wall 35f is integrated with either one of a pair of the side walls 35h, and the other end of the partition wall forms a slight space between the other side wall 35h. An oxidizing gas flow path 36A is formed between the three rows of the partition walls 35f. The oxidizing gas flow path 36A extends zigzag among the side walls 35f.

Between the partition walls 35f and partition walls 35d are formed totally four partition walls 35e each having a rectangular parallelopiped shape. These totally four partition walls 35e having a narrow width are arranged in the form of one row in the width direction of the separator 35D, and two widthwise outer partition walls 35e are integrated with the side walls 35h, respectively. Between the adjacent partition walls 35e, short oxidizing gas flow paths 36 are formed at totally three locations.

In this embodiment, since the oxidizing gas flow path extend zigzag and are bent in the preheating area 54, the distance by which the oxidizing gas flows becomes far longer as compared with the case where the oxidizing gas flow path is straight. Therefore, the oxidizing gas can be more effectively preheated.

Figure 23:
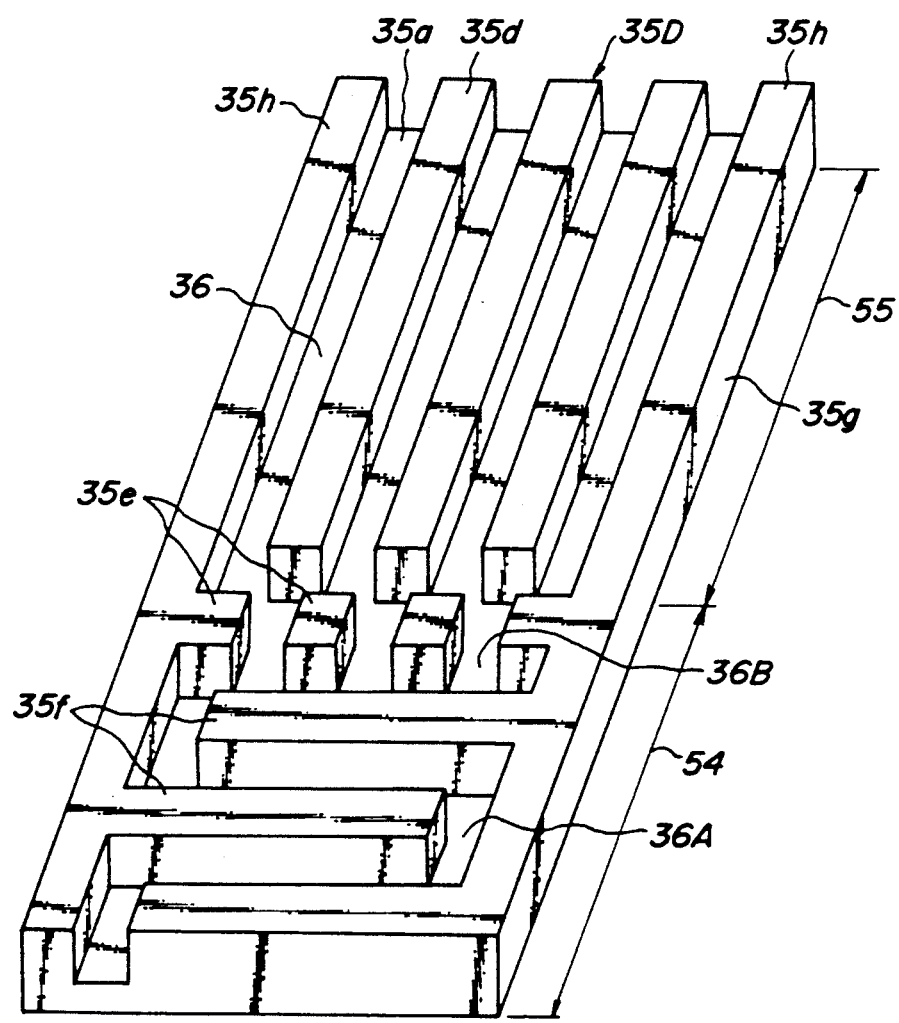
FIG. 23 is a perspective view of a separator 35D.

However, since the extrusion-shaping process cannot be applied to the separator 35D as shown in FIG. 23, productivity largely drops as compared with the separator shown in FIG. 21.

In the above-mentioned embodiments, the cell units each having a rectangular plane shape are used. However, the plane shape of the cell unit may be parallelogram. In this case, it is preferable that the ratio of the long side to the short side is not less than 2.

Further, it is preferable that the sectional area of the oxidizing gas flow path as cut in the width direction is 0.1 to 2 cm$^2$.

This is because if the sectional area is less than 0.1 cm$^2$, it is difficult to provide the oxidizing gas-introducing pipe. On the other hand, if the sectional area is more than 2 cm$^2$, the volume of the oxidizing gas in the cell unit is so large that a large amount of the oxidizing gas needs to be introduced beyond the necessity.

In the case of the cell unit of the type which no feed pipe is necessary when assembled into the power generator, the sectional area of the oxidizing gas flow path as cut in the width direction is preferably 0.01 to 2 cm$^2$.

The heat-resistive conductor not interrupting the flowing of the gas is preferably made of a felt material formed by knitting heat-resistive metallic fibers or a spongy material having numerous open cells. As the material for them, nickel is preferred. The spongy material may be produced, for example, by kneading a heat-resistive metallic powder with a foaming agent and a binder, shaping the mixture, and firing the shaped body.

According to the second aspect of the present invention, since the cell element is in the flat board-shaped form, the power-generating area can be largely increased and the amount of the power generated per unit volume can be increased as compared with the cylindrical SOFC. Further, since the solid electrolyte can be formed by flame spraying or the like, the productivity and the production cost of the solid electrolyte can be increased, as compared with the cylindrical SOFC requiring that the solid electrolyte film needs to be formed by EVD or the like.

In addition, a pair of the side walls are provided on the separator made of the dense electron conductor, the oxidizing gas flow paths are formed between side walls, the oxidizing gas flow paths are covered with the air electrode, the air electrode is joined to a pair of the side walls, and the conductive partition walls are joined to the flat board-shaped body and the air electrode. By so doing, since the current-flowing path is formed through the air electrode and the partition walls, the distance through which current flows in parallel with the air electrode film can be largely shortened. As a result, particularly, since the internal resistance in the air electrode can be reduced, outputs from the cell unit can be increased. Furthermore, the partition walls in addition to a pair of the side walls are joined to the flat board-shaped body and the partition walls themselves are made of the dense material, the structural strength of the cell unit is largely increased, and the reliability as a stack is improved, as compared with the conventional flat SOFC.

Although the planar cell units are used in the above-mentioned embodiments, the present invention can be also applied to cylindrical cell units.

Figure 24:
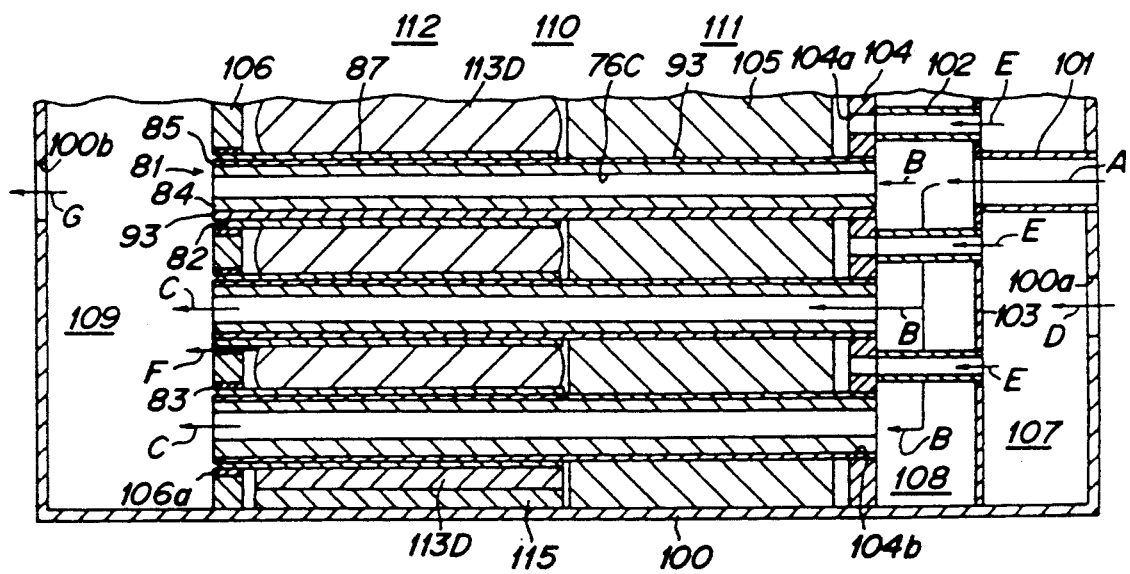
FIG. 24 is a sectional view of a part of a further power generator, cut in a longitudinal direction of cell units, in which the cell units are assembled together.
Figure 25:
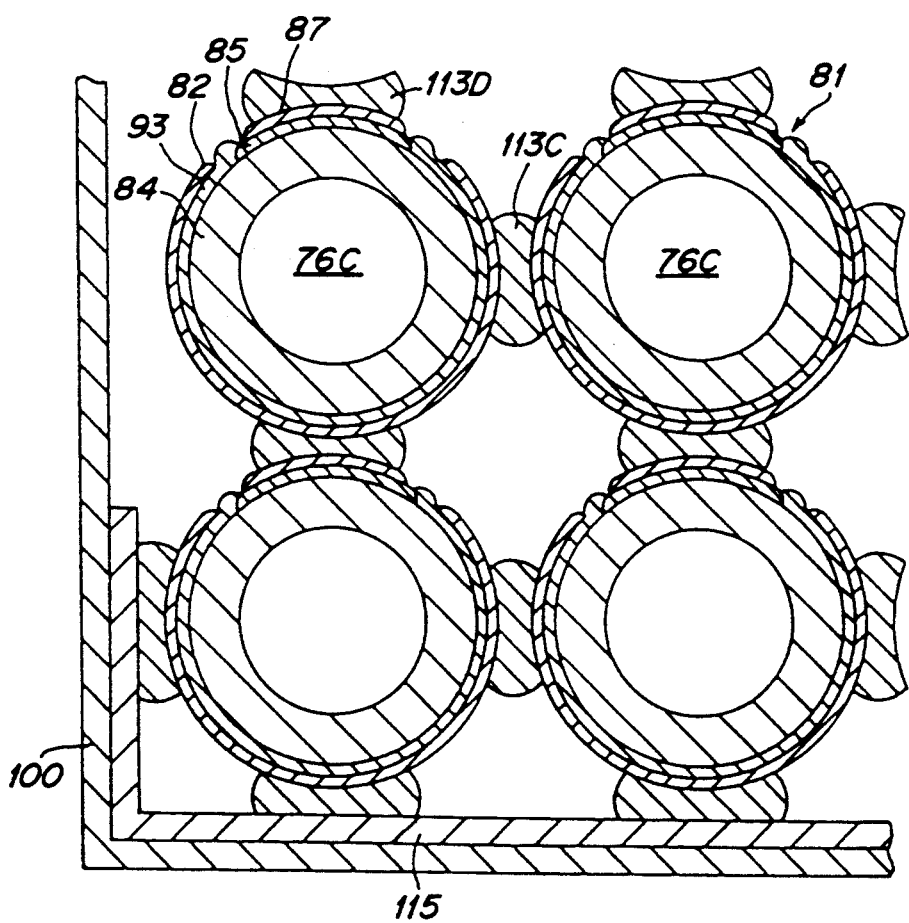
FIG. 25 is a sectional view of a part of the power generator of FIG. 24 cut in a width direction of the unit cells.

Now, an embodiment in which the present invention is applied to a case where cylindrical cell units having opposite ends opened in the longitudinal direction are assembled together. FIG. 24 is a sectional view of a part of the power generator according to this embodiment cut in the longitudinal direction of the cell units 81. FIG. 25 is a sectional view of a part of the power generator cut in the width direction of the cell units 81.

A cylindrical substrate of an air electrode 84 is formed from a porous air electrode material, and a cylindrical oxidizing gas flow path 76C is formed inside the air electrode 84. The oxidizing gas flow path 76C is opened at opposite ends of the cell unit 81 in the longitudinal direction. In a power generating area 112, the cell units 81 each have a widthwise sectional shape shown in FIG. 25. That is, a solid electrolyte 93 is formed on the outer surface of the air electrode 14 leaving a part thereof. An interconnector 85 is formed on an area of the air electrode where no solid electrolyte 93 is present. The surface of the air electrode 84 is covered with the solid electrolyte and the interconnector.

A fuel electrode 82 is formed on the surface of the solid electrolyte 93, and a connecting terminal 87 is formed on a surface of the interconnector 85. The thus constructed cell units 81 are arranged vertically and laterally as shown in FIG. 25. Due to the dimensional limitation of the drawings, only three lower cell units 81 are shown in FIG. 24, and only two lower cell units and two left cell units are shown in FIG. 25.

In FIG. 25, the fuel electrodes 82 of the laterally adjacent cell units are connected through heat-resistive conductor 113C. At the same time, the fuel electrode 82 of the cell unit 81 is connected to the connection terminal 87 of the vertically adjacent cell unit 81 through the heat-resistive conductor 113D. In FIG. 25, the lowermost cell unit 81 is connected to a current-collecting plate 115.

In a power-generating area 112, the interconnectors 85, the connecting terminals 87 and the fuel electrodes 83 are arranged as mentioned above, but these constituent elements need not be provided in the preheating area 111. In the illustrated embodiment, although not illustrated, the entire surface of the air electrode 84 as the substrate is covered with the solid electrolyte 83, and no cut is provided between the interconnector 85 and the solid electrolyte 93.

The other parts of the power generator in FIGS. 24 through 26 are substantially the same as those of the embodiment in FIGS. 20 and 21. A reference numeral 100 is a container provided with oxidizing gas openings 100a and combustion gas opening 100b. An oxidizing gas chamber 107 is separated from a fuel gas chamber 108 by a partition wall 103, and the fuel gas chamber is separated from the power-generating chamber 110 by a partition wall 104, and the power generating chamber 110 is separated from a combustion chamber 109 by a partition wall 106. Reference numerals 101 and 102 denote a fuel gas feed pipe and an oxidizing gas feed pipe, respectively. References A through G denote the same flows of the gases as in FIG. 20 and 21. The thus constructed power generator in FIGS. 24 and 25 can attain the same effects (5), (6) and (7) as mentioned in connection with the embodiment of FIGS. 1 through 8. Further, different from this, the sealing is gas-tightly effected between the partition wall and the end of the cell unit in the case of this embodiment. In order to flow the fuel gas, no gas-tight sealing is necessary on the side of the partition wall. In this case, the power-generating area is heated to high temperatures of around 1,000° C. For this reason, the preheating area is formed by arranging the heat-insulating material between the partition wall and the power-generating area. As a matter of course, the temperature inside the preheating area rapidly lowers toward the partition wall. In order to effect the above gas-tight sealing for the partition wall, the temperature of the sealed portion must be set far lower than that in the power-generating area, preferably set at for example, 500° C. or less. When the temperature of the sealed portion is set at not more than 350° C., the latitude of the kinds of the resin sealing materials to be selected can be widened. However, if the temperature is set at not more than 100° C., the length of the preheating area needs to be increased, so that the amount of the power generated per unit volume decreases. Therefore, the temperature is preferably in a range of 100° C. to 350° C. The fuel gas and the oxidizing gas are preliminarily heated while passing the preheating area.

The present invention may be applied to the collecting of cell units 91 as shown in FIG. 26 in a widthwise sectional view.

An air electrode 94 is provided on the entire peripheral surface of a cylindrical porous base body 20 made of zirconia or the like. A solid electrolyte 83 and an interconnector 85 are formed on a surface of the air electrode 94. A fuel electrode 82 is formed on a surface of the solid electrolyte 93, and a connecting terminal 87 is formed on a surface of the interconnector 85. In this case, an oxidizing gas flow path 86c is also opened at opposite ends in the longitudinal direction of the cell unit 91.

The heat-resistive conductor not interrupting the flowing of the gas is preferably made of a felt material obtained by knitting heat-resistive metallic fibers or of a spongy material as mentioned above. As the metal, nickel is preferred. As mentioned above, the spongy material may be produced by kneading a heat-resistant metallic powder with a foaming agent and a binder, shaping the mixture and firing the shaped body.

According to the embodiment of the present invention, the power-generating chamber is divided into the power-generating area and the preheating area, the oxidizing gas chamber is separated from the preheating area by the gas-tight partition wall, and the sealing is gas-tightly effected between the gas-tight partition wall and each cell unit. Further, the fuel gas is made to enter the combustion chamber through the preheating area and the power-generating area, and the oxidizing gas is made to flow through each of the oxidizing gas flow paths of each cell unit form one end to the other.

Therefore, the fuel gas can be separated from the oxidizing gas without being mixed together by gas-tightly sealing between the gas-tight partition wall and each of the cell units. For example, since no unstable sealing material such as a molten glass is used, the sealing can be effected stably for a long time. In addition, since the oxidizing gas is separated from the fuel gas by gas-tightly sealing one end of each cell unit, used oxidizing gas may be flown into the combustion chamber provided in the other end of the cell unit in the longitudinal direction of the cell unit. Therefore, it is no need to seal one end of the cell unit in the longitudinal direction. Further, it is unnecessary to insert an oxidizing gas feed pipe into the oxidizing gas flow path of the cell unit.

What is claimed is:

1. A cell unit for use in a solid oxide fuel cell, said cell unit having a laminate structure comprising:
    a cell element comprising a dense and planar solid electrolyte and an air electrode film and a fuel electrode film provided on opposite surfaces of said solid electrolyte, respectively, said cell element having a rectangular planar shape and a ratio of a short side to a long side of said rectangular planar shape being not less than 2;
    a separator comprising a dense electron conductor; and
    a plurality of oxidizing gas flow paths defined between said separator and said air electrode of said cell element.

2. A power generator comprising a plurality of said cell units of claim 1 arranged at a given interval, wherein a fuel gas chamber, a power-generating chamber, a combustion chamber and an oxidizing gas chamber are provided in a power generator body, the fuel electrodes and openings of a plurality of said cell units are arranged in substantially the same directions, respectively, the fuel electrode of each of the cell units is connected to the separator of the vertically adjacent cell unit in series by a heat-resistive conductor not interrupting flowing of a gas, the separators of the laterally adjacent cell units are connected to each other in parallel through a heat-resistive conductor not interrupting flowing of the gas, the power-generating chamber is separated from the combustion chamber by a partition wall, an open end of each of the cell units is inserted into respective cell unit-inserting holes provided in said partition wall, a buffer material is provided between each of the cell units and the partition wall, an oxidizing gas feed pipe is inserted into each of the oxidizing gas flow paths, through said opening of the cell unit, an oxidizing gas in the oxidizing gas chamber is supplied into the combustion chamber through the oxidizing gas feed pipe and the oxidizing gas flow path, and a fuel gas inside the fuel gas chamber is supplied into the combustion chamber through the power-generating chamber and the cell unit-inserting hole.

3. The power generator of claim 2, wherein said heat-resistive conductor is made of a felt material comprising nickel.

4. The power generator of claim 2, wherein said heat-resistive conductor is made of a spongy material comprising nickel.

5. The cell unit of claim 1, wherein said solid electrolyte is exposed on a surface of said air electrode film at outer peripheral edge portions along three sides of said solid electrolyte, slender projections are formed on corresponding outer peripheral edge portions of a surface of said separator opposing said air electrode, a plurality of grooves are formed on said opposing surface of said separator, said slender projections are gas-tightly joined to said exposed outer peripheral edge portions of said solid electrolyte, and a plurality of said grooves constitute oxidizing gas flow paths.

6. The cell unit of claim 1, wherein said electron conductor is an electron-conductive ceramic.

7. The cell unit of claim 1, wherein a thickness of the planar solid electrolyte ranges from 10 $\mu$m to 500 $\mu$m.

8. The cell unit of claim 1, wherein said separator comprises a flat rectangular plane-shaped body having a length and a width, and a pair of side walls projecting from an outer peripheral portion of a first major surface of said body, said pair of side walls extending along the length of said body; said air electrode is joined to said pair of side walls; said solid electrolyte covers one of two major surfaces of said air electrode, longitudinal side surfaces of said air electrode, and a portion of outer surfaces of said pair of side walls; and said cell unit further comprises at least one conductive partition wall defining at least one oxidizing gas flow path in a space defined by said flat body, said pair of side walls and said air electrode, said at least one conductive partition wall being joined to said flat body and said air electrode.

9. The cell unit of claim 8, wherein said electron conductor is an electron-conductive ceramic.

10. The cell unit of claim 8, wherein a thickness of the planar solid electrolyte ranges from 10 $\mu$m to 500 $\mu$m.

11. The cell unit of claim 8, wherein each of said oxidizing gas flow paths extends parallel to the length of said separator, and a cross-sectional area of each oxidizing gas flow path is 0.01 to 2 cm$^2$.

12. The cell unit of claim 8, wherein said separator further comprises an end partition wall projecting from said first major surface of said body at a first end peripheral portion thereof to close a first end of each of said oxidizing gas flow paths, wherein said end partition wall contacts said air electrode, and said solid electrolyte further covers a corresponding end surface of said air electrode and a portion of a corresponding outer surface of said end partition wall.

13. The cell unit of claim 8, wherein each of said oxidizing gas flow paths is open at opposite ends in a longitudinal direction of said separator, and each of said oxidizing gas flow paths communicates between said opposite ends in the longitudinal direction of said separator.

14. The cell unit of claim 13, wherein each of said oxidizing gas flow paths is substantially straight, and the oxidizing gas flow paths extend in parallel to each other from one end to the other of said separator in the longitudinal direction thereof.

15. The cell unit set of claim 13, wherein said oxidizing gas flow paths are formed in a substantially straight form and in parallel to each other at a portion to be located in a power-generating area of a power generator, and the oxidizing gas flow paths are bent in a portion to be located in a preheating area of the power generator as viewed in plane.

16. The cell unit of claim 7, wherein each of said oxidizing gas flow paths extends in parallel to said long side, and a cross-sectional area of the oxidizing gas flow path cut in a width direction of the oxidizing gas flow path is 0.1 to 2 cm$^2$.

17. A power generator comprising a plurality of cell units assembled together, said cell units each having an oxidizing gas flow path formed therein and open at opposite ends in a longitudinal direction of the cell unit, at least a fuel electrode film being formed on a surface of each of said cell units, wherein at least a fuel gas chamber, an oxidizing gas chamber, a power generating chamber and a combustion chamber are provided in a power generator body, said power generating chamber is divided into a power-generating area and a preheating area, a plurality of said cell units are arranged in said power-generating chamber at a given interval while fuel electrode films and openings of a plurality of said cell units are arranged in substantially the same directions, respectively, the adjacent cell units are connected to one another in series and in parallel by heat-resistive conductors each having a structure not interrupting flowing of a gas, said oxidizing gas chamber is separated from said preheating area by a gas-tight partition wall, sealing is gas-tightly effected between said gas-tight partition wall and each of the cell units, a fuel gas inside said fuel gas chamber is made to enter said combustion chamber through said preheating area and said power-generating area, and an oxidizing gas inside the oxidizing chamber is made to enter said combustion chamber through said oxidizing gas flow paths.

18. The power generator of claim 17, wherein said cell units each comprise a separator and a cell element, said separator being made of a dense electron conductor and having a pair of side walls on a surface of a flat board-shaped body having a rectangular plane shape at opposite edges in a width direction thereof, said cell element comprising an air electrode joined to said side walls of the separator, a dense solid electrolyte covering a surface and widthwise side surfaces of said air electrode as well as a part of outer wall faces of said side walls of the separator, and a fuel electrode provided on a surface of the solid electrolyte, a conductive partition wall being provided in a space surrounded by the flat board-shaped body, a pair of side walls and said air electrode to form oxidizing gas flow paths, and said partition wall being joined to said flat board-shaped body and said air electrode.

19. The power generator of claim 17, wherein each of said oxidizing gas flow paths is open at opposite ends as viewed in a longitudinal direction of the separator, and each of the oxidizing gas flow paths communicates between said opposite ends of the separator.

20. The power generator of claim 17, wherein said heat-resistive conductor is made of one of a felt material of nickel and a spongy material of nickel.

21. The power generator of claim 17, wherein said sealing is gas-tightly effected between said gas-tight partition wall and said cell units by using at least one of gaskets and organic resin.

22. The power generator of claim 17, wherein a temperature of a sealed portion between said gas-tight partition wall and each of said cell units is not more than 500° C.

23. The power generator of claim 22, wherein a gas-permeable insulating material is arranged around an outer periphery of each cell unit in said preheating area.

24. The power generator of claim 17, wherein a gas-permeable insulating material is filled in the oxidizing gas flow path of each cell unit in said preheating area.

* * * * *

UNITED STATES PATENT AND TRADEMARK OFFICE
CERTIFICATE OF CORRECTION

PATENT NO. : 5,292,599
DATED : March 8, 1994
INVENTOR(S) : Takao Soma, et. al.

It is certified that error appears in the above-indentified patent and that said Letters Patent is hereby corrected as shown below:

On the Title page, item [22], change "Sept. 2, 1992 to Sept. 21, 1992--.

Signed and Sealed this

Twenty-eighth Day of June, 1994

Attest:

BRUCE LEHMAN

*Attesting Officer*  *Commissioner of Patents and Trademarks*